(12) United States Patent
Kang et al.

(10) Patent No.: US 9,762,947 B2
(45) Date of Patent: Sep. 12, 2017

(54) METHOD FOR PROVIDING APPLICATION MENU IN IMAGE DISPLAY DEVICE, AND IMAGE DISPLAY DEVICE USING SAME

(75) Inventors: Haengjoon Kang, Pyeongtaek-si (KR); Myongwon Suh, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/993,391

(22) PCT Filed: Sep. 8, 2011

(86) PCT No.: PCT/KR2011/006639
§ 371 (c)(1),
(2), (4) Date: Aug. 13, 2013

(87) PCT Pub. No.: WO2012/081803
PCT Pub. Date: Jun. 21, 2012

(65) Prior Publication Data
US 2013/0326557 A1 Dec. 5, 2013

Related U.S. Application Data

(60) Provisional application No. 61/423,078, filed on Dec. 14, 2010.

(30) Foreign Application Priority Data

Dec. 28, 2010 (KR) .................. 10-2010-0136283

(51) Int. Cl.
*H04N 5/445* (2011.01)
*H04N 21/431* (2011.01)
*G06F 3/0482* (2013.01)
*G06F 3/0346* (2013.01)
*H04N 21/258* (2011.01)

(52) U.S. Cl.
CPC ......... *H04N 21/431* (2013.01); *G06F 3/0346* (2013.01); *G06F 3/0482* (2013.01); *H04N 21/25891* (2013.01); *H04N 21/4316* (2013.01)

(58) Field of Classification Search
CPC ........................ H04N 21/482; H04N 21/488
See application file for complete search history.

(56) References Cited

U.S. PATENT DOCUMENTS 5,485,197 A * 1/1996 Hoarty ............................ 725/37
6,028,600 A * 2/2000 Rosin et al. .................. 715/718
(Continued)

FOREIGN PATENT DOCUMENTS

CN         1925577 A       3/2007
CN       101232589 A       7/2008
(Continued)

OTHER PUBLICATIONS

Written Opinion of the International Search Report PCT/KR2011/006639 (Translation).
(Continued)

*Primary Examiner* — Dominic D Saltarelli
(74) *Attorney, Agent, or Firm* — KED & Associates, LLP

(57) ABSTRACT

The present invention relates to a method for maintaining various application installed in an image display device, and more particularly, to a method for operating an image display device, the method allowing a user to more conveniently select and execute applications in configuring selection menus of the applications, and to an image display device using the method. The method comprises: searching for applications which can be used on an image display device; displaying a first application list including selected menu items of the selected applications; and displaying one or more application key screens from among the applications which are included in the first application list. Accordingly, the user of the image display device can be provided, from the image display device, with application menus, which include menu items for running the applications that can be used on the image display device.

16 Claims, 29 Drawing Sheets

(56) References Cited

U.S. PATENT DOCUMENTS

| | | |
|---|---|---|
| 2002/0042921 A1 | 4/2002 | Ellis |
| 2006/0236342 A1 | 10/2006 | Kunkel et al. |
| 2007/0139443 A1 | 6/2007 | Marks et al. |
| 2008/0235749 A1* | 9/2008 | Jain .................... H04N 7/17318 725/114 |
| 2009/0133069 A1 | 5/2009 | Conness et al. |
| 2009/0158311 A1* | 6/2009 | Hon et al. ........................ 725/14 |
| 2009/0288021 A1* | 11/2009 | Ioffe ....................... H04L 67/34 715/760 |
| 2010/0153885 A1 | 6/2010 | Yates |
| 2012/0072436 A1* | 3/2012 | Pierre ................... G06Q 30/00 707/758 |

FOREIGN PATENT DOCUMENTS

| | | |
|---|---|---|
| CN | 101883233 A | 11/2010 |
| JP | 2009-519552 | 5/2009 |
| KR | 10-2003-0078933 | 10/2003 |
| WO | WO 02/071749 | 9/2002 |

OTHER PUBLICATIONS

International Search Report issued in PCT Application No. PCT/KR2011/006639 dated Apr. 10, 2012.
European Search Report issued in Application No. 11849587.8 dated Mar. 11, 2015.
Chinese Office Action dated Dec. 1, 2015 issued in Application No. 201180067013.5 (English Translation Attached).

* cited by examiner

810 — Sign-in to yhoo!

http://www.yhoo.net/

ID

820 — ******

PASSWORD

825 — ******

☐ AUTO SIGN-IN (b)

http://www.yhoo.net/mail/tttt

| tttt@yhoo.net | received box | |
|---|---|---|
| ✉ read mail | sender | title |
| ✉ write mail | KK | aaa |
| ✉ check mail | LL | bbb111111111111111111111111 |
| | MM | ccccccccccccccccc |
| • received box | NN | dddddddddddddddddd |
| • sent box | OO | eeeeeeeeeeeeeeeeeeeeee |
| • spam box | PP | No title |
| • recycle bin | | 1 2 3 4 5 ··· |

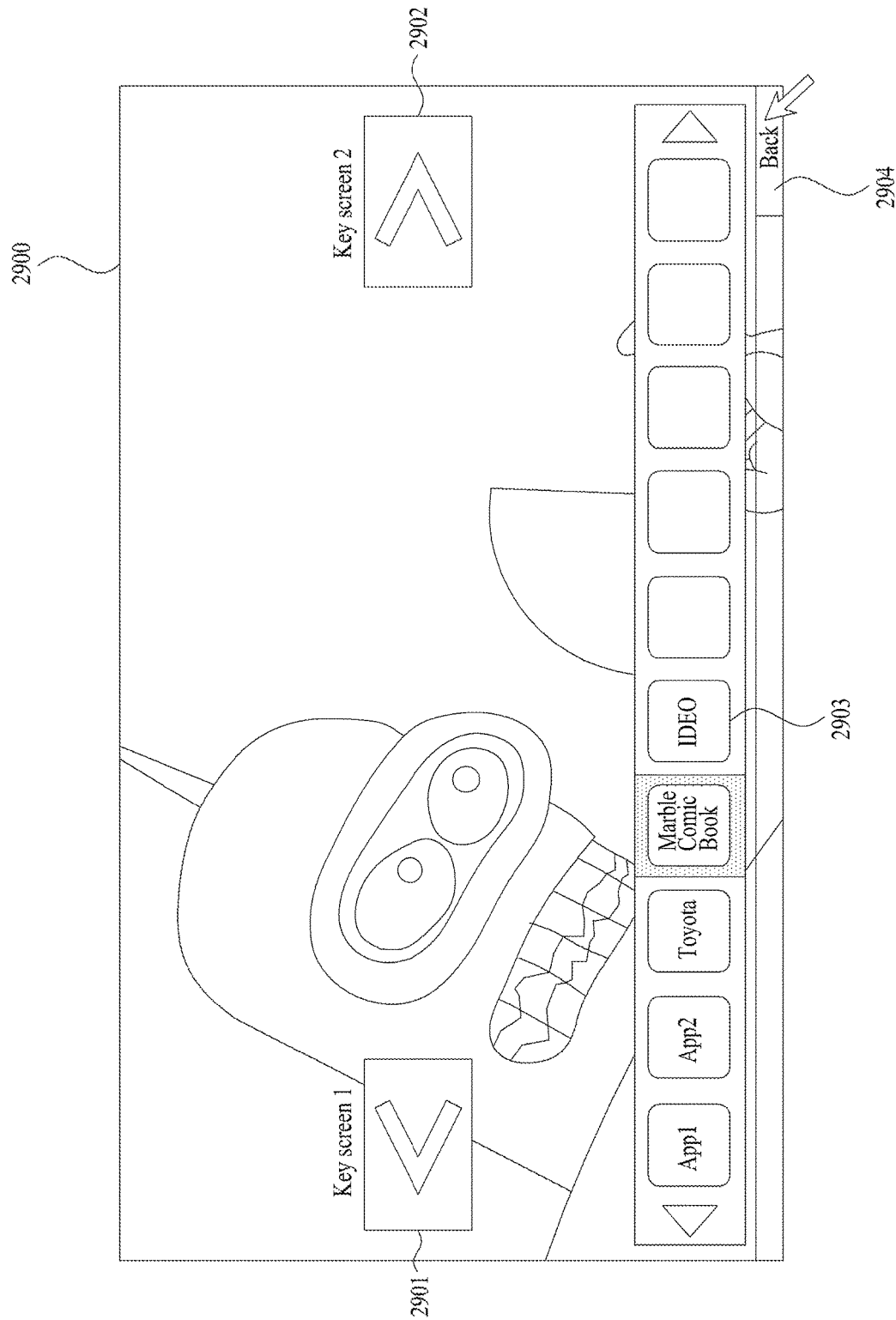

METHOD FOR PROVIDING APPLICATION MENU IN IMAGE DISPLAY DEVICE, AND IMAGE DISPLAY DEVICE USING SAME

CROSS-REFERENCE TO RELATED PATENT APPLICATIONS

This application is a U.S. National Stage Application under 35 U.S.C. §371 of PCT Application No. PCT/KR2011/006639, filed Sep. 8, 2011, which claims priorty to U.S. Provisional Application Ser. No. 61/423,078, filed Dec. 14, 2010, and Korean Patent Application No. 10-2010-0136283, filed on Dec. 28, 2010.

TECHNICAL FIELD

The present invention relates to an image display device and a method of operating the image display device, and more particularly, to a method of operating the image display device capable of enhancing convenience of use of a user and an image display device therefor.

In particular, in managing various applications installed in an image display device, the present invention relates to a method of operating an image display device enabling a user to more conveniently select and execute an application in case of configuring selection menus of an application in the image display device and to an image display device therefor.

BACKGROUND ART

For instance, an image display device is a device equipped with a function of receiving and processing a broadcasting image that a user is able to watch. For instance, the image display device shows a broadcast selected by a user among broadcasting signals transmitted by a broadcasting station in a display. It is a current global trend that a broadcast is converting from an analog to a digital.

A digital broadcasting means a broadcasting transmitting digital images and audio signals. The digital broadcasting has less data loss since the digital broadcasting is strong on an external noise, is better at error correction, has higher resolution, and provides a clearer screen compared to an analog broadcasting. And, unlike the analog broadcasting, the digital broadcasting is able to execute a bidirectional service.

Meanwhile, a smart TV, which combines a function of an image display device and a function of a multimedia device, is recently getting the spotlight.

The smart TV corresponds to an intelligent terminal where such computer supporting functions as internet communication, information search, and the like are added to an image display device. The smart TV is equipped with a high-capacity of memory and a high-performance CPU (central processing unit) compared to a legacy image display device. And, the smart TV is embedded with an operating system (OS) to support execution of various applications, audio/data communication, PC (personal computer) interlocking, and the like. Unlike the legacy image display device, if the smart TV is used, it is able to freely use a service via the internet. In particular, one of the characteristics of the smart TV is to enable a user to install a preferred application in the smart TV in a manner of downloading the application from external.

And, due to the development of the operating system of the smart TV, a plurality of applications can be installed and executed in the smart TV.

Yet, as mentioned in the above, if various applications are installable in one image display device or various applications is installed in one image display device, it is difficult for the image display device of a prior art to identify that which application is appropriate for performing a needed operation, since it is difficult to identify the information on each of the applications.

Hence, if the various applications are available in an image display device as a result of solving the aforementioned problem of the image display device of a prior art, it is strongly required to have a method of checking the information on each of the applications and a method of executing an application in a manner of precisely selecting a necessary application and an image display device using the method.

DISCLOSURE OF THE INVENTION

Technical Objects

An object of the present invention is to provide a method of managing an application of an image display device capable of enhancing convenience of use of a user and an image display device using the method.

Another object of the present invention is to provide a method of providing an application menu, which enables a user to check information on applications available in an image display device and to precisely select an application for performing a preferred operation, and an image display device using the method.

Another object of the present invention is to provide a method of managing an application of an image display device capable of providing various user interfaces and an image display device using the method.

Technical Solution

To achieve these and other advantages and in accordance with the purpose of the present invention, as embodied and broadly described, a method of providing an application menu of an image display device includes the steps of searching for an application available in the image display device, displaying a $1^{st}$ application list containing a selection menu item of the searched application, and displaying an application key screen of at least one application among applications contained in the $1^{st}$ application list.

To further achieve these and other advantages and in accordance with the purpose of the present invention, an image display device capable of executing an application includes an application management unit configured to search for an application available in the image display device, a menu generating unit configured to generate a $1^{st}$ application list containing a selection menu item of the searched application, a key screen generating unit configured to generate an application key screen of at least one application among applications contained in the $1^{st}$ application list, and a control unit configured to control the $1^{st}$ application list and the key screen to be displayed.

Advantageous Effects

According to embodiment of the present invention, since an image display device can provide a user with an application menu including menu items for executing each application available in the image display device, the user can search and execute a preferred application precisely and easily.

According to embodiment of the present invention, a service provider (SP) or a contents provider (CP) can efficiently display an advertising screen in an application menu of an image display device without aversion of a user.

Meanwhile, according to a different embodiment of the present invention, since various user interfaces are provided for an image display device, convenience of use of a user can be enhanced.

DESCRIPTION OF DRAWINGS

FIG. 18 is a diagram of a $4^{th}$ embodiment of a user interface provided by a random one among image display devices according to embodiments of the present invention;

FIG. 29 is a diagram of a display screen including a key screen conversion menu according to embodiment of the present invention.

BEST MODE

In the following description, the present invention is explained in more detail with reference to the drawings.

A suffix 'module' and 'unit' for a composing element in the following description is simply used for clarity of writing the present specification. Thus, the 'module' and the 'unit' can be used in a manner of being mixed.

Meanwhile, an image display device described in the present specification corresponds to an intelligent image display device, which adds a computer supporting function to a broadcast receiving function for example. The image display device can be equipped with such an easy-to-use interface as a input device of a hand writing type, a touch screen, a spatial remote controller, or the like by adding the internet function as well as fulfilling a function of receiving a broadcast. And, the image display device may be able to perform such a function as e-mailing, web-browsing, banking, game or the like by accessing the internet and a computer with the help of a wired or wireless internet function. A standardized general-purpose operating system (OS) can be used for the aforementioned various functions.

Hence, an image display device described in the present invention can perform user-friendly various functions since various applications can be freely added or deleted on a general-purpose OS kernel for example. More specifically, the image display device may correspond to a network TV, a Hybrid Broadcast Broadband TV (HBBTV), a smart TV, and the like. In some cases, the image display device is applicable to a smart phone as well.

Moreover, although the embodiment of the present invention is explained in detail with reference to the following attached drawings and the contents written on the drawings, the present invention may be non-limited by the embodiments.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Figure 1:
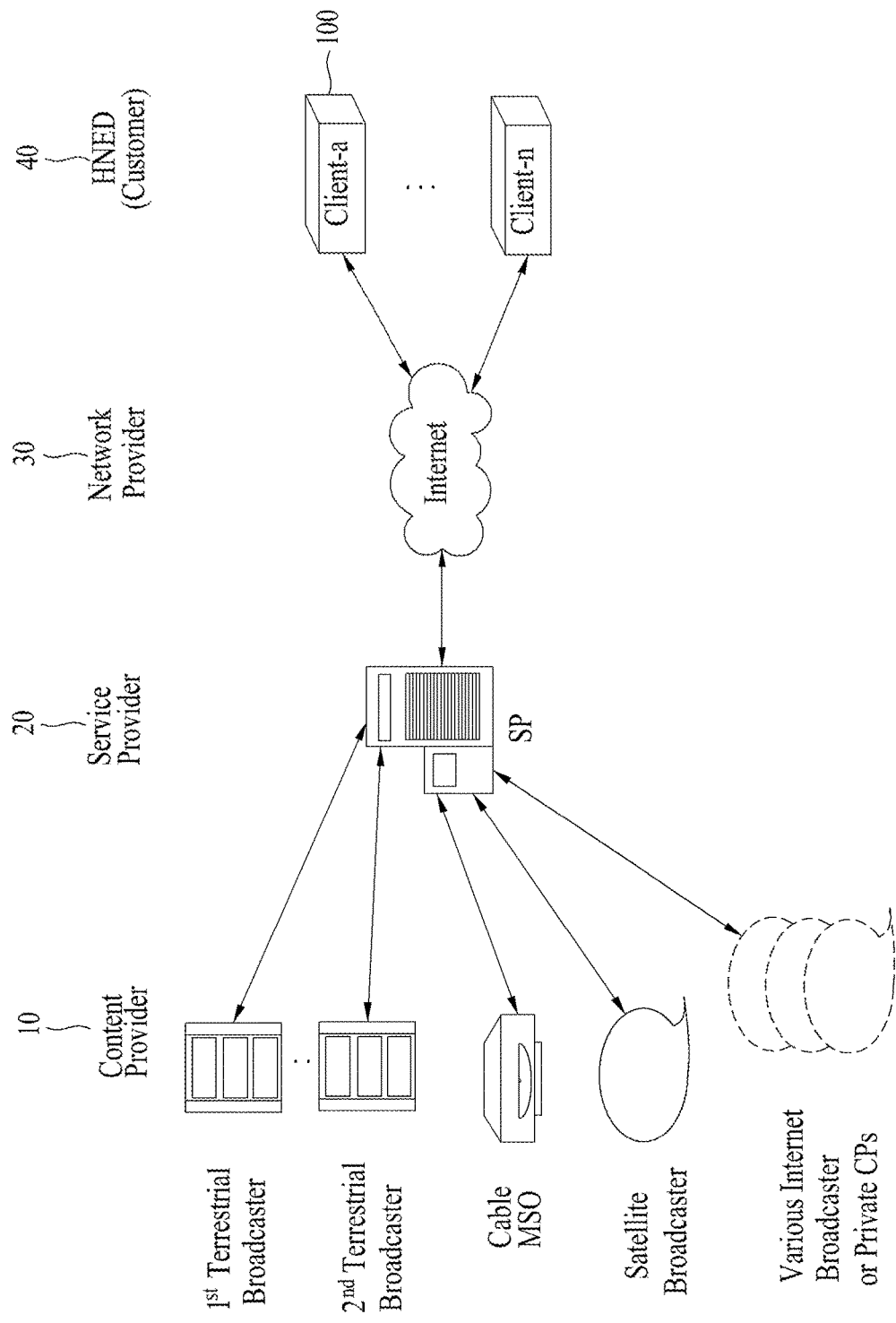
FIG. 1 is a schematic diagram of an example of a whole broadcasting system including an image display device according to one embodiment of the present invention.

FIG. 1 is a schematic diagram of an example of a whole broadcasting system including an image display device according to one embodiment of the present invention.

As shown in FIG. 1, a whole broadcasting system including an image display device according to one embodiment of the present invention can be classified into a content provider (CP) 10, a service provider (SP) 20, a network provider (NP) 30, and a HNED 40. The HNED corresponds to a client 100, which is an image display device according to embodiment of the present invention for example. The client 100 corresponds to an image display device according to one embodiment of the present invention and the image display device corresponds to a network TV, a smart TV, an IPTV, or the like for example.

The content provider 10 produces a variety of content and provides them. As shown in FIG. 1, the content provider 10 may include a terrestrial broadcaster, a cable broadcast provider (cable SO (system operator) or MSO (multiple system operator)), a satellite broadcaster, an internet broadcaster, and the like.

And, the content provider 10 may be able to provide various applications as well as broadcasting content. This shall be described in detail later.

The service provider 20 may be able to provide the contents provided by the content provider 10 in a manner of packaging the contents. For instance, the service provider 20 in FIG. 1 may be able to provide a user with a 1st terrestrial broadcast, a 2nd terrestrial broadcast, a cable MSO, a satellite broadcast, various internet broadcasts, applications, and the like in a manner of packaging the aforementioned broadcasts, applications and the like.

Meanwhile, the service provider 20 may be able to provide a service to a client side using a unicast or multicast scheme. The unicast scheme is a scheme to transmit a data in a manner of 1-to-1 between a transmitter and a receiver. For instance, in case of the unicast scheme, if a reception device makes a request for a data to a server, the server can transmit the data to the reception device according to the request. The multicast scheme is a scheme to transmit a data to a plurality of receivers of a specific group. For instance, a server may be able to transmit data to a plurality of reception devices, which are registered in advance, all at once. Hence, IGMP (internet group management protocol) and the like can be used for a multicast registration.

The network provider 30 may be able to provide a network to provide a service to a client 100. The client 100 may get a service in a manner of establishing a home network end user (HNED).

As a means for protecting contents transmitted from the aforementioned image display device, conditional access, content protection, or the like can be used. As an example of the conditional access or the content protection, such a scheme as a cable card or a DCAS (downloadable conditional access system) can be used.

Meanwhile, the client 100 can also provide content via a network. In this case, unlike the aforementioned case, the client 100 may become a content provider and the content provider 10 may receive the content from the client 100. If it is designed like the mentioned above, there exist a merit of bidirectional content service or data service.

Figure 2:
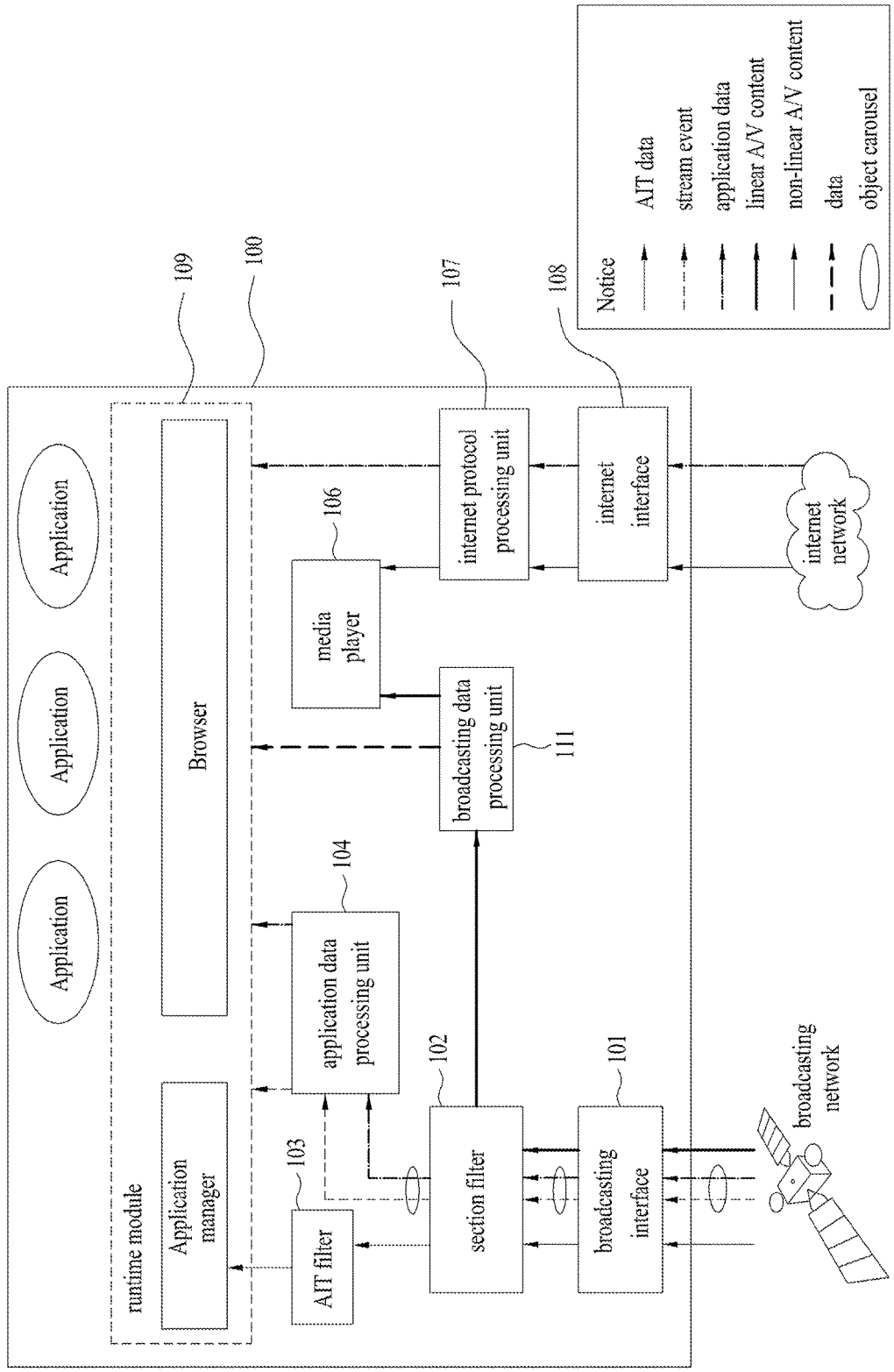
FIG. 2 is a schematic diagram of a different example of a whole broadcasting system including an image display device according to a different embodiment of the present invention.

FIG. 2 is a schematic diagram of a different example of a whole broadcasting system including an image display device according to a different embodiment of the present invention.

As shown in FIG. 2, an image display device 100 according to a different embodiment of the present invention is connected to a broadcasting network and an internet network. The image display device 100 corresponds to a network TV, a smart TV, a HBBTV, or the like for example.

And, for instance, the image display device includes a broadcasting interface 101, a section filter 102, an AIT filter 103, an application data processing unit 104, a broadcasting data processing unit 111, a media player 106, an internet protocol processing unit 107, an internet interface 108, and a runtime module 109.

An AIT (application information table) data, a real-time broadcasting content, an application data, and a stream event are received via the broadcasting interface 101. Meanwhile, the real-time broadcasting content can be named linear A/V content.

The section filter 102 performs a section filtering for 4 kinds of data received via the broadcasting interface 101 and transmits the AIT data, the linear A/V content, and the stream event & application data to the AIT filter 103, the broadcasting data processing unit 111, and the application data processing unit 104, respectively.

Meanwhile, non-linear A/V content and an application data are received via the internet interface 108. The non-linear A/V content may correspond to an COD (content on demand) application for example.

The non-linear A/V content is transmitted to the media player 106 and the application data is transmitted to the runtime module 109.

Moreover, as shown in FIG. 2, the runtime module 109 includes an application manager and a browser for example. The application manager controls a life cycle for an interactive application using an AIT data for example. And, the browser performs a function of indicating and processing the interactive application for example.

Figure 3:
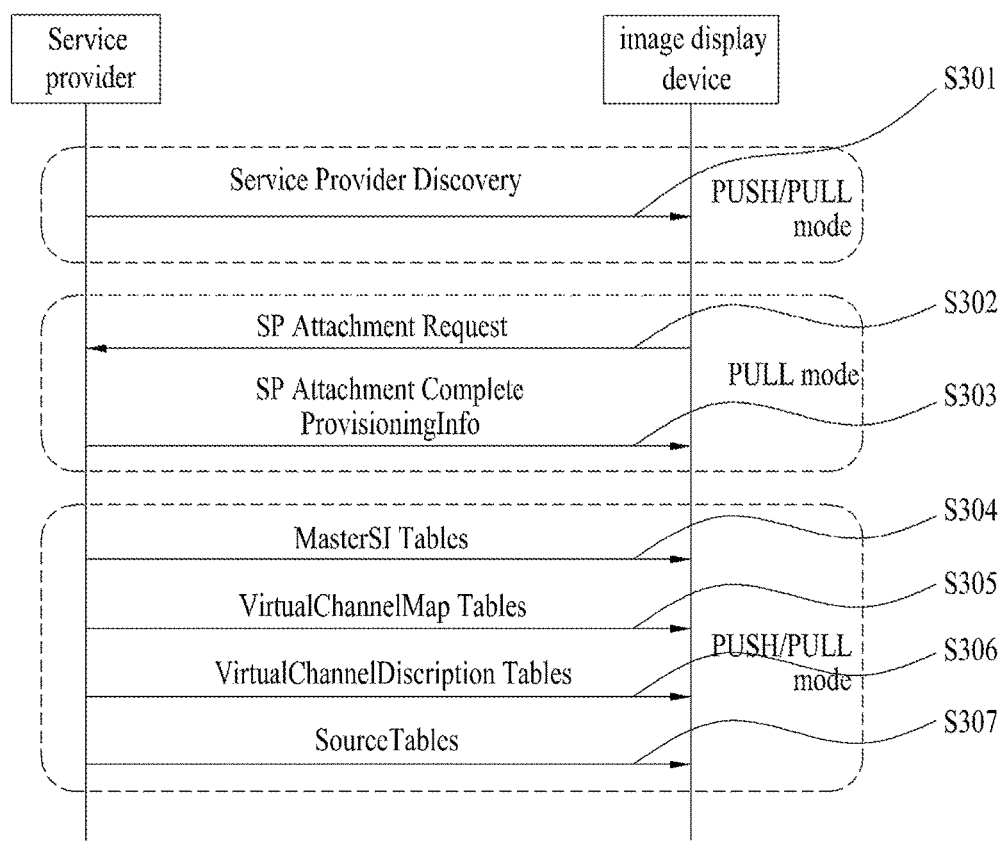
FIG. 3 is a diagram of steps of receiving a channel information and the like in a manner that an image display device depicted in FIG. 1 or FIG. 2 accesses a service provider.

FIG. 3 is a diagram of steps of receiving channel information and the like in a manner that an image display device depicted in FIG. 1 or FIG. 2 accesses a service provider. FIG. 3 is just an embodiment and a scope of right of the present invention may be non-limited to a method of FIG. 3.

A service provider performs a service provider discovery operation [S301]. An image display device transmits a service provider (SP) attachment request signal [S302]. If a SP attachment is completed, the image display device receives provisioning information [S303]. Moreover, the image display device receives a master SI table from the service provider [S304], receives a Virtual Channel Map table from the service provider [S305], receives a Virtual Channel Description table from the service provider [S306], and receives a Source table from the service provider [S307].

Detail description is as follows.

The service provider discovery may mean a process that service providers providing a service related to an IPTV search for a server providing information on a service of the service providers.

A method of finding an address list capable of receiving information (e.g., SP discovery information) on a SD (service discovery) server has 3 kinds as follows. First, it is able to use an address preconfigured in an image display device or an address configured by a manual operation of a user. Second, it is able to use a DHCP-based SP discovery method. Third, it is able to use a DNS SRV-based SP discovery method. And, the image display device accesses a server of the address obtained by one of the aforementioned 3 methods and then receives a service provider discovery record including information necessary for performing a service discovery according to a SP. And, the image display device performs a service discovery step using the service provider discovery record. These processes can be performed in a push mode or a pull mode.

The image display device performs a registration procedure (or service attachment procedure) in a manner of accessing an SP attachment server designated as an SP attachment locator of the SP discovery record.

Moreover, the image display device may perform a service authentication procedure after performing a separate authentication procedure by accessing an authentication service server of the SP designated as an SP authentication locator.

Meanwhile, a data transmitted to the image display device from the server after a successful service attachment procedure may have a form of a provisioning information table.

The image display device provides a data to the server in a manner of including an ID and location information of the image display device in the service attachment process and a service attachment server may be able to specify a service to which the image display device subscribed based on the data. Moreover, address information capable of obtaining service information, which is intended to receive by the image display device, is provided in a form of a provisioning information table. The address information corresponds to the attachment information of a master SI table. If the aforementioned method is used, it is easy to provide a customized service according to a subscriber.

The service information includes a master SI table record managing attachment information on a virtual channel map and version, a virtual channel map table providing a service list of a package form, a virtual channel description table including detail information of each channel, a source table including attachment information capable of accessing an actual service, and the like.

Figure 4:
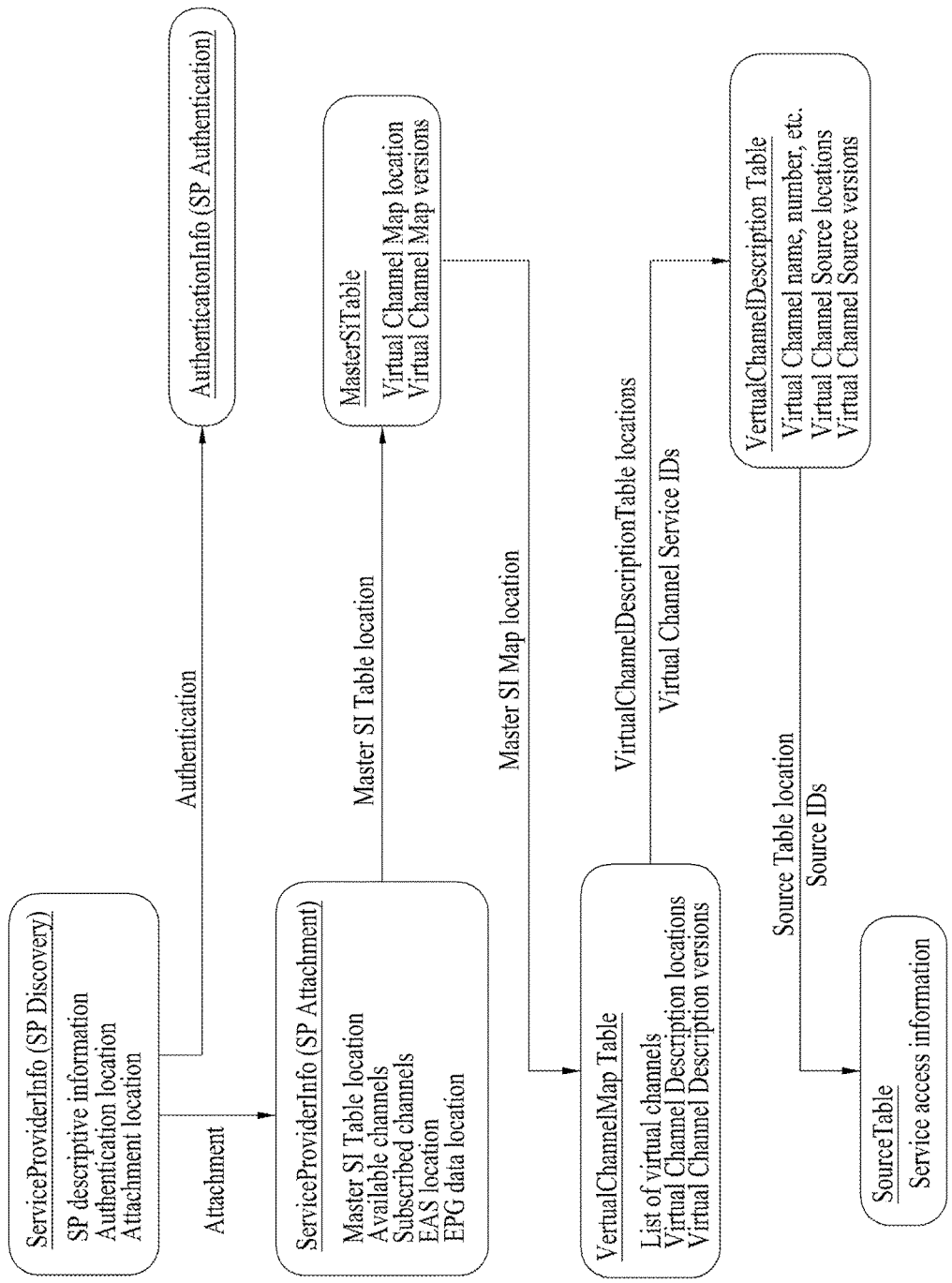
FIG. 4 is a diagram of an example of data used in the steps depicted in FIG. 3.

FIG. 4 is a diagram of an example of data used in the steps depicted in FIG. 3.

FIG. 4 is a diagram depicting FIG. 3 in more detail. Relationship between data in SI is explained with reference to FIG. 4 in the following description.

A Master SI table includes location information capable of receiving each virtual channel map and version information of each of the virtual channel maps.

Each of the virtual channel maps is uniquely identified by a virtual channel map identifier and a virtual channel map version indicates version information of the virtual channel map. If one of the tables, which are connected to each other from the master SI table in an arrow direction, is modified, a version of the corresponding table increases and versions of all upper tables (up to the master SI table) increase as well. Hence, by monitoring the master SI table, it may be able to check a change in a whole SI table right away.

For instance, if there is a change in the source table, a version of the source table increases. And, a version of the virtual channel description table, which references the source table, is modified as well. Hence, a change in a lower table causes a change in an upper table. Consequently, the version of the master SI table is modified.

Every service provider may have one Master SI table. Yet, in case that a service configuration varies according to a region or a subscriber (or subscriber group), it is designed for the service provider to get a plurality of master SI tables to provide a customized service according to each unit. If it is designed like the mentioned above, a customized service suitable for a region of a subscriber, subscription information, and the like can be efficiently provided.

The virtual channel map table may have at least one virtual channel. The virtual channel map table does not include detail information on a channel in a virtual channel map but includes location information capable of obtaining the detail information. A virtual channel description location of the virtual channel map table informs a location of a description table of a virtual channel description table, which includes the detail information on the channel.

The virtual channel description table includes detail information of a virtual channel and may be able to access the virtual channel description table using the virtual channel description location of the virtual channel map table.

The source table provides attachment information (e.g., an IP address, a port, an AV codec, a transmission protocol, etc.) necessary for accessing an actual service according to a service.

The aforementioned master SI table, the virtual channel map table, the virtual channel description table, and the source table are logically delivered via 4 divided flows and can be performed in a push mode or a pull mode. Meanwhile, the master SI table can be transmitted by a multicast scheme for a version management and monitors a version change in a manner of receiving a multicast stream.

Figure 5:
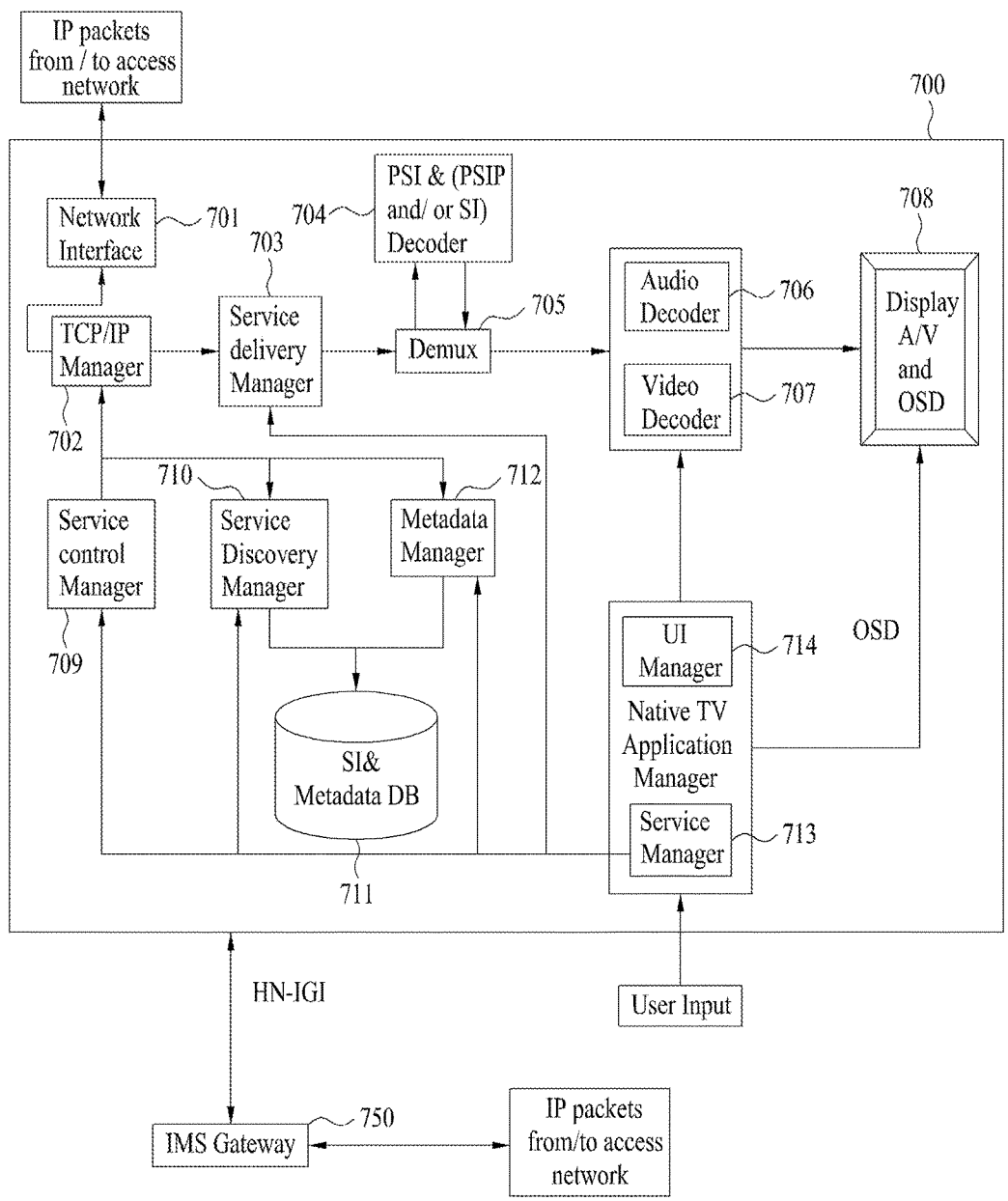
FIG. 5 is a diagram showing in detail an example of an image display device depicted in FIG. 1 or FIG. 2.

FIG. 5 is a diagram showing in detail an example of an image display device depicted in FIG. 1 or FIG. 2. Yet, the diagram depicted in FIG. 5 is just an embodiment and a scope of right of the present invention should be determined not by FIG. 5 but by a scope of a request for a patent.

An image display device 700 includes a network interface 701, a TCP/IP manager 702, a service delivery manager 703, a demultiplexer (Demux) 705, a PSI& (PSIP and/or SI) decoder 704, an audio decoder 706, a video decoder 707, a display unit (display A/V and OSD module) 708, a service control manager 709, a service discovery manager 710, a metadata manager 712, an SI & metadata DB 711, an UI manager 714, and a service manager 713.

The network interface unit 701 receives packets received from a network and transmits a packet to the network. In particular, the network interface unit 701 receives a service, contents, and the like from a service provider via the network.

The TCP/IP manager 702 controls a packet delivery for a packet received by the image display device and the packet transmitted by the image display device, in particular, controls the packet delivery from a source to a destination. And, the TCP/IP manager 702 classifies the received packet to correspond to an appropriate protocol and outputs packets classified into the service delivery manager 705, the service discovery manager 710, the service control manager 709, and the metadata manager 712.

The service delivery manager 703 is in charge of controlling a received service data. For instance, in case of controlling a real-time streaming data, the service delivery manager may use an RTP/RTCP. In case of transmitting the real-time streaming using the RTP, the service delivery manager 703 transmits the received data packet to the demultiplexer 705 in a manner of parsing the data packet according to the RTP or stores the received data packet in the SI & metadata DB 711 according to a control of the service manager 713. And, the service delivery manager feedbacks the network reception information to a server side, which provides a service, using the RTCP.

The demultiplexer 705 demultiplexes the received packet into an audio, a video, a PSI (program specific information)

data, and the like and then transmits the audio, the video, the PSI (program specific information) data to the audio/video decoder 706/707, the PSI& (PSIP and/or SI) decoder 704, respectively.

The PSI& (PSIP and/or SI) decoder 704 decodes such service information as a PSI (program specific information), and the like. In particular, the PSI& (PSIP and/or SI) decoder 704 receives a demultiplexed PSI section, a PSIP (program and service information protocol) section, an SI (service information) section, or the like from the demultiplexer 705 and then decodes the demultiplexed PSI section, the PSIP (program and service information protocol) section, the SI (service information) section, or the like.

And, the PSI& (PSIP and/or SI) decoder 704 makes a DB for service information in a manner of decoding the received sections and stores the DB for the service information in the SI & metadata DB 711.

The audio decoder and video decoder 706/707 decode a video data and an audio data received from the demultiplexer 705. The audio data decoded by the audio decoder 706 and the video data decoded by the video decoder 707 are provided to a user via the display unit 708.

The UI manager 714 and the service manager 713 manage overall state of the image display device 700, provide a user interface, and manage a different manager.

The UI manager 714 provides a GUI (graphic user interface) for a user using an OSD (On Screen Display) and the like, receives a key input from the user, and performs a receiver operation according to the input. For instance, if the UI manager receives a key input for a channel selection, the UI manager transmits the key input signal to the service manager 713.

The service manager 713 controls such managers relevant to a service as the service delivery manager 703, the service discovery manager 710, the service control manager 709, the metadata manager 712, and the like.

And, the service manager 713 makes a channel map and selects a channel using the channel map according to the key input received from the user interface manager 714. And, the service manager 713 receives service information of the channel from the PSI& (PSIP and/or SI) decoder 704 and then configures audio/video PID (packet identifier) of the selected channel in the demultiplexer 705.

The service discovery manager 710 provides information necessary for selecting a service provider providing a service. If a signal for a channel selection is received from the service manager 713, the service discovery manager 710 finds a service using the information.

The service control manager 709 is in charge of selecting and controlling a service. For instance, if a user selects such a legacy broadcasting scheme as a live broadcasting service, the service control manager uses IGMP or RTSP. If the user selects such a service as a VOD (video on demand), the service control manager performs selecting and controlling a service using the RTSP. The RTSP protocol can provide a trick mode for a real-time streaming. And, the service control manager 709 can initialize and manage a session going through an IMC gateway using an IMS (IP multimedia subsystem) and a SIP (session initiation protocol). The protocols are just one embodiment. Different protocols can be used according to an implementation case.

The metadata manager 712 manages a metadata relevant to a service and stores the metadata in the SI & metadata DB 711.

The SI & metadata DB 711 stores the service information decoded by the PSI& (PSIP and/or SI), the metadata managed by the metadata manager 712, and the information necessary for selecting a service provider provided by the service discovery manager 710. And, the SI & metadata DB 711 can store a setup data for a system and the like.

The SI & metadata DB 711 can be implemented using a non-volatile RAM (NVRAM), a flash memory, or the like.

Meanwhile, the IG 750 is a gateway including functions necessary for approaching an IMS-based IPTV service.

Figure 6:
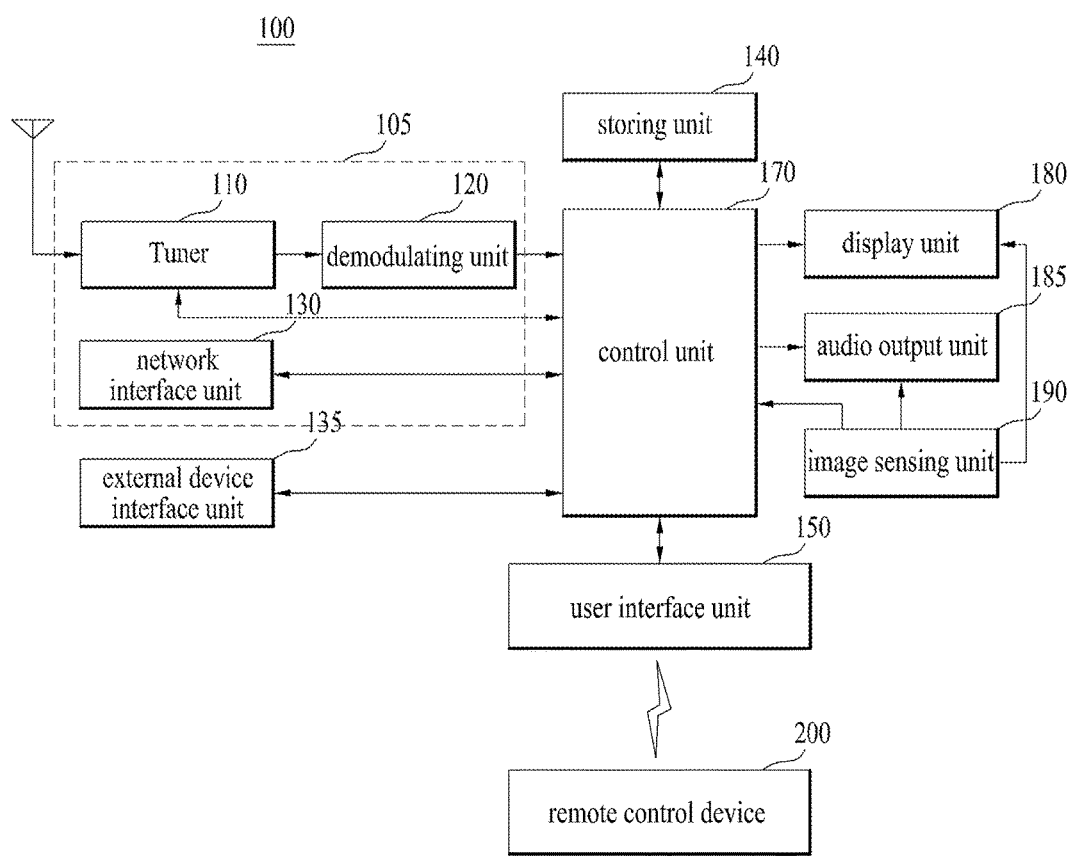
FIG. 6 is a diagram showing in detail a different example of an image display device depicted in FIG. 1 or FIG. 2.

FIG. 6 is a diagram showing in detail a different example of an image display device depicted in FIG. 1 or FIG. 2.

Referring to FIG. 6, an image display device 100 according to one embodiment of the present invention can include a broadcasting receiving unit 105, an external device interface unit 135, a storing unit 140, a user input interface unit 150, a control unit 170, a display unit 180, an audio output unit 185, a power supply unit 190, and an image taking unit (not depicted). The broadcasting receiving unit 105 can include a tuner 110, a demodulating unit 120, and a network interface unit 130. Of course, it is able to design the image display device to be equipped with the tuner 110 and the demodulating unit 120 without the network interface unit 130. On the contrary, it is also possible to design the image display device to be equipped with the network interface unit 130 without the tuner 110 and the demodulating unit 120.

The tuner 110 selects a channel selected by a user or an RF broadcasting signal corresponding to all preconfigured channels among RF (radio frequency) broadcasting signals received by an antenna. And, the tuner converts the selected RF broadcasting signal into an intermediate frequency signal, baseband image, or an audio signal.

And, the tuner 110 can receive an RF broadcasting signal of a single carrier according to an ATSC (Advanced Television System Committee) scheme or an RF broadcasting signal of a plurality of carriers according to a DVB (Digital Video Broadcasting) scheme.

The demodulating unit 120 performs a demodulation operation by receiving a digital IF signal (DIF) converted in the tuner 110.

For instance, if a digital IF signal outputted from the tuner 110 corresponds to the signal of the ATSC scheme, the demodulating unit 120 performs an 8-VSB (8-vestigal side band) demodulation for example. And, the demodulating unit 120 may perform a channel decoding. To this end, the demodulating unit 120 can perform a Trellis decoding, de-interleaving, and Reed Solomon decoding in a manner of installing a Trellis decoder, a de-interleaver, a Reed Solomon decoder, and the like.

After performing a demodulation and a channel decoding, the demodulating unit 120 can output a stream signal (TS). In this case, the stream signal may correspond to an image signal, an audio signal, or a multiplexed data signal. As an example, the stream signal may correspond to an image signal of MPEG-2 standard or MPEG-2 TS (transport stream), which is a multiplexed audio signal and the like of Dolby AC-3 standard. Specifically, the MPEG-2 TS can include a header of 4 bytes and a payload of 184 bytes.

Meanwhile, the aforementioned demodulating unit 120 can be separately equipped with according to the ATSC scheme and the DVB scheme. In particular, the demodulating unit can be separately equipped with an ATSC demodulating unit and a DVB demodulating unit.

The stream signal outputted from the demodulating unit 120 can be inputted to the control unit 170. After performing demultiplexing, video/audio signal processing, and the like, the control unit 170 outputs an image in the display unit 180 and outputs an audio in the audio output unit 185.

The external device interface unit 135 can access an external device with the image display device 100. To this end, the external device interface unit 135 can include an A/V input/output unit (not depicted) or a radio communication unit (not depicted).

The external device interface unit 135 can access such an external device as a DVD (digital versatile disc), a blue ray, a game device, a camera, a camcorder, a computer (notebook), and the like in wired or wireless. The external device interface unit 135 delivers an image, an audio, or a data signal inputted from an external via a connected external device to the control unit 170 of the image display device 100. And, the external device interface unit 135 can output the image, the audio, or the data signal processed by the control unit 170 to the external device. To this end, the external device interface unit 135 can include an A/V input/output unit (not depicted) or a radio communication unit (not depicted).

The A/V input/output unit can include an USB terminal, a CVBS (composite video banking sync) terminal, a component terminal, an S-video terminal (analog), a DVI (digital visual interface) terminal, an HDMI (high definition multimedia interface) terminal, an RGB terminal, a D-SUB terminal, and the like to input an image and an audio signal of the external device to the image display device 100.

The radio communication unit can perform a short range radio communication with a different electronic device. The image display device 100 can be connected to a different electronic device with a network according to such a communication standard as Bluetooth, RFID (radio frequency identification), infrared communication (IrDA, infrared data association), UWB (ultra wideband), ZigBee, DLNA (digital living network alliance), and the like.

And, the external device interface unit 135 accesses various set top boxes via at least one of the aforementioned various terminals and may perform an input/output operation with a set top box.

Meanwhile, the external device interface unit 135 can deliver an application or an application list of a neighboring external device to the control unit 170 or the storing unit 140 in a manner of receiving the application or the application list of the neighboring external device.

The network interface unit 130 provides an interface configured to connect the image display device 100 to a wired/wireless network including an internet network. In order to access a wired network, the network interface unit 130 can be equipped with an Ethernet terminal for example. In order to access a wireless network, the network interface unit can use such a communication standard as WLAN (Wireless LAN) (Wi-Fi), Wibro (Wireless Broadband), Wimax (World Interoperability for Microwave Access), HSDPA (High Speed Downlink Packet Access), and the like.

The network interface unit 130 can transmit or receive a data with a different user or a different electronic device via an accessed network or a different network linked to the accessed network. In particular, the network interface unit can transmit a part of content data stored in the image display device 100 to a selected user or a selected electronic device among different users registered in the image display device 100 or different electronic devices.

Meanwhile, the network interface unit 130 can access a prescribed web page via an accessed network or a different network linked to the accessed network. In particular, the network interface unit can transmit and receive a data with a corresponding server in a manner of accessing a prescribed web page via a network. Besides, the network interface unit can receive contents or data provided by a content provider or a network administrator. In particular, the network interface unit can receive such content as a movie, an advertisement, a game, VOD, a broadcasting signal, and the like provided by the content provider or a network provider and the information related to the content via a network. And, the network interface unit can receive update information and an update file of a firmware provided by the network administrator. And, the network interface unit can transmit data to the internet provider, the content provider, or the network administrator.

And, the network interface unit 130 can receive a preferred application among the applications opened to the public in a manner of selecting via a network.

The storing unit 140 can store a program configured to process and control each signal in the control unit 170, a signal processed image, an audio, or a data signal.

And, the storing unit 140 may perform a function of temporarily storing an image, an audio, or a data signal inputted from the external device interface unit 135 or the network interface unit 130. And, the storing unit 140 can store the information on a prescribed broadcasting channel via a channel memory function.

And, the storing unit 140 can store an application or an application list inputted from the external device interface unit 135 or the network interface unit 130.

And, the storing unit may store various platforms described later.

The storing unit 140 can include at least one type of storage media selected from the group consisting of a flash memory type, a hard disk type, a multimedia card micro type, a card type memory (e.g., an SD memory, an XD memory, or the like), a RAM, a ROM (EEPROM etc.). The image display unit 100 can provide the content file (a moving image file, a still image file, a music file, a document file, an application file, and the like) stored in the storing unit 140 to a user by playing the content file.

Although FIG. 6 depicts an embodiment that the storing unit 140 is separately installed with the control unit, the scope of the present invention may be non-limited to this. The storing unit 140 can be included in the control unit 170.

The user input interface unit 150 delivers a signal inputted by a user to the control unit 170 or delivers a signal from the control unit 170 to the user.

For instance, the user input interface unit 150 can receive and process such a control signal as power on/off, channel selection, screen configuration, and the like from the remote control device 200 according to such various communication schemes as an RF (radio frequency) communication scheme, an infrared (IR) communication scheme, and the like. Or, the user input interface unit can process to transmit a control signal from the control unit 170 to the remote control device 200.

And, for instance, the user input interface unit 150 can deliver a control signal inputted from such a local key as a power key, a channel key, a volume key, a configuration key, and the like to the control unit 170.

And, for instance, the user input interface unit 150 delivers a control signal inputted from a sensing unit (not depicted), which senses a gesture of a user, to the control unit 170 or can transmit a signal from the control unit 170 to the sensing unit (not depicted). In this case, the sensing unit (not depicted) can include a touch sensor, an audio sensor, a position sensor, an operation sensor, and the like.

The control unit 170 demultiplexes an inputted stream via the tuner 110, the demodulating unit 120, or the external device interface unit 135. Or, the control unit can generate and output a signal for an image or an audio output by processing the demultiplexed signals.

An image signal, which is image processed in the control unit 170, is inputted to the display unit 180 and can be displayed as an image corresponding to the corresponding image signal. And, the image signal, which is image processed in the control unit 170, can be inputted to an external output device via the external device interface unit 135.

An audio signal processed in the control unit 170 can be audio outputted to the audio output unit 185. And, the audio signal processed in the control unit 170 can be inputted to the external output device via the external device interface unit 135.

Although it is not depicted in FIG. 6, the control unit 170 can include a demultiplexing unit, an image processing unit, and the like. This shall be described later with reference to FIG. 10.

Besides, the control unit 170 can control overall operation in the image display device 100. For instance, the control unit 170 can control the tuner 110 to tune an RF broadcasting, which corresponds to a channel selected by a user or a pre-stored channel.

And, the control unit 170 can control the image display device 100 by a user command inputted via the user input interface unit 150 or an internal program. In particular, the control unit enables a user to download a preferred application or an application list in the image display device by accessing a network.

For instance, the control unit 170 controls the tuner 110 to input a signal of a selected channel according to a prescribed channel selection command, which is received via the user input interface unit 150. And, the control unit processes an image, an audio, or a data signal of the selected channel. The control unit 170 makes the display unit 180 or the audio output unit 185 to output an image processed by channel information selected by a user or an audio signal.

As a different example, the control unit 170 makes the display unit 180 or the audio output unit 185 to output the image signal or the audio signal inputted from such an external device as a camera or a camcorder via the external device interface unit 135 according to an external device image play command received via the user input interface unit 150.

Meanwhile, the control unit 170 can control the display unit 180 to display an image. For instance, the control unit can control the display unit 180 to display a broadcasting image inputted via the tuner 110, an external input image inputted via the external device interface unit 135, an image inputted via the network interface unit, or an image stored in the storing unit 140. In this case, the image displayed in the display unit 180 may correspond to a still image, a moving image, a 2 dimensional image, or a 3 dimensional image.

And, the control unit 170 can control content to be played. In this case, the content may correspond to the content stored in the image display device 100, a received broadcasting content, or an external input content inputted from external. The content may correspond to at least one selected from the group consisting of a broadcasting image, an externally inputted image, an audio file, a still image, an accessed web screen, and a document file.

The control unit 170 can control an application downloaded from an external network together with various user interfaces to be installed and executed. And, the control unit can control an image related to the application, which is executed by a user selection, to be displayed in the display unit 180.

And, the control unit 170 can include an application management unit 1701, a menu generating unit 1702, and a key screen generating unit 1703 in relation to embodiment of the present invention.

The application management unit 1701 is a module managing an application available in the image display device. In particular, the application management unit 1701 can configure an application list by searching for application available in the image display device. And, the application available in the image display device can include an application installed in the image display device or an application installable to the image display device from a server according to embodiment.

The menu generating unit 1702 is a module generating a selection menu item of an application for which the application management unit searched. In particular, the menu generating unit can generate an application list including an application selection menu item in a manner of including icon information, text information, and the like of the application.

The key screen generating unit 1703 is a module generating a key screen.

The key screen is an information window displayed in a form of a card including such image information as a screenshot for an application and the like. The key screen generating unit 1703 can generate an advertisement key screen including a key screen of at least one application and an advertisement image among the application included in the application list, which is generated by the menu generating unit 1702.

And, the key screen generating unit 1703 can receive image information and text information included in the key screen via the network interface unit.

The control unit 170 can control the display unit to display an application list and a key screen.

And, if an application selection signal is received via the user interface unit 150, the control unit 170 can control the display unit to display a key screen corresponding to the selected application in a manner of expanding, a key screen list capable of being scrolled, which includes at least one key screen different from the expanded key screen, and detail information corresponding to the selected application.

And, if an application confirmation signal is received via the user interface unit 150, the control unit 170 can control the display unit to display a key screen of the selected application as a full screen.

And, if an application execution signal is received via the user interface unit, the control unit 170 can control an application corresponding to the key screen on the full screen to be executed.

And, in a state that the key screen is displayed in a manner of being expanded as a full screen, the control unit 170 can display a $2^{nd}$ application list including an application execution menu item. And, if a prescribed application selection signal included in the $2^{nd}$ application list is inputted, the control unit can convert the key screen on the full screen.

The menu generating unit 1702 and the key screen generating unit 1703 can be included in an OSD generating unit, which is included in the control unit 170. Regarding the OSD generating unit, it shall be described in detail in FIG. 10.

Meanwhile, although it is not depicted in the diagram, it is possible to further include a channel browsing processing unit configured to generate a thumbnail image corresponding to a channel signal or an external input signal.

The channel browsing processing unit can generate a thumbnail image in a manner of receiving a stream signal (TS) outputted from the demodulating unit 120, the stream signal outputted from the external device interface unit, or the like and extracting an image from the inputted stream signal. The generated thumbnail image can be inputted to the control unit 170 as it is or in a manner of being coded. And, the generated thumbnail image can also be inputted to the control unit 170 in a manner of being coded in a form of a stream. The control unit 170 can display a thumbnail list equipped with a plurality of thumbnail images using the inputted thumbnail image in the display unit 180. Meanwhile, the thumbnail images in the thumbnail list can be updated sequentially or simultaneously. By doing so, a user can easily identify the contents of a plurality of broadcasting channels.

The display unit 180 generates a driving signal by converting an image signal, a data signal, an OSD signal processed in the control unit 170 or the image signal, a data signal, and the like received from the external device interface unit 135 into R, G, B signal, respectively.

The display unit 180 may correspond to a PDP, an LCD, an OLED, a flexible display, a 3 dimensional display, and the like.

Meanwhile, the display unit 180 can be used as an input device in a manner of being configured with a touch screen as well as an output device.

The audio output unit 185 outputs an audio in a manner of receiving such an audio-processed signal as a stereo signal, a 3.1 channel signal, or a 5.1 channel signal from the control unit 170. The audio output unit 185 can be implemented by a speaker of various forms.

The power supply unit 190 supplies corresponding power to the overall image display device 100.

In particular, the power supply unit can supply power to the control unit 170 capable of being implemented in a form of a System on Chip (SOC), the display unit 180 configured to display an image, and the audio output unit 185 configured to output an audio.

To this end, the power supply unit 190 can be equipped with a converter (not depicted) converting AC power supply into DC power supply. Meanwhile, for instance, if the display unit 180 is implemented with a liquid crystal panel equipped with a plurality of backlight lamps, the power supply unit can be further equipped with an inverter (not depicted) capable of performing PWM operation for brightness variable or a dimming operation.

The remote control device 200 transmits a user input to the user input interface unit 150. To this end, the remote control device 200 can use Bluetooth, an RF (radio frequency) communication, an infrared (IR) communication, an UWB (Ultra Wideband), ZigBee scheme, and the like.

And, the remote control device 200 receives an image outputted from the user input interface unit 150, an audio, or a data signal and displays it in the remote control device 200 or can output an audio or a vibration.

The aforementioned image display device 100 may correspond to a digital broadcasting receiver capable of receiving at least one of a digital broadcasting of ATSC scheme (8-VSB scheme) as a fixed form, a digital broadcasting of DVB-T scheme (COFDM scheme), a digital broadcasting of ISDB-T scheme (BST-OFDM scheme), and the like.

Meanwhile, a block diagram of the image display device 100 depicted in FIG. 2 is a block diagram for one embodiment of the present invention. Each of the configuration elements of the block diagram can be combined, added, or omitted according to the specification of an image display device 100 to be actually implemented. In particular, if necessary, 2 or more configuration elements can be combined into one or one configuration element can be configured in a manner of being divided into 2 or more configuration elements. And, the function performed in each block is just for describing embodiment of the present invention and the scope of right of the present invention may be non-limited to the detail operation and device of the display device.

Meanwhile, unlike the image display device depicted in FIG. 6, the image display device can receive and play image content via the network interface unit 130 or the external device interface unit 135 without the tuner 110 and the demodulating unit 120 depicted in FIG. 6.

Meanwhile, the image display device 100 is an example of an image signal processing device performing a process for an image stored in a device or a signal of an inputted image. As a different example of an image signal processing device, it is possible to exemplify a set top box without the display unit 180 and the audio output unit 185 depicted in FIG. 6, the aforementioned DVD player, a Blue ray player, a gaming device, a computer, and the like. Regarding the set top box, it is described with reference to FIG. 7 and FIG. 8 as follows.

Figure 7:
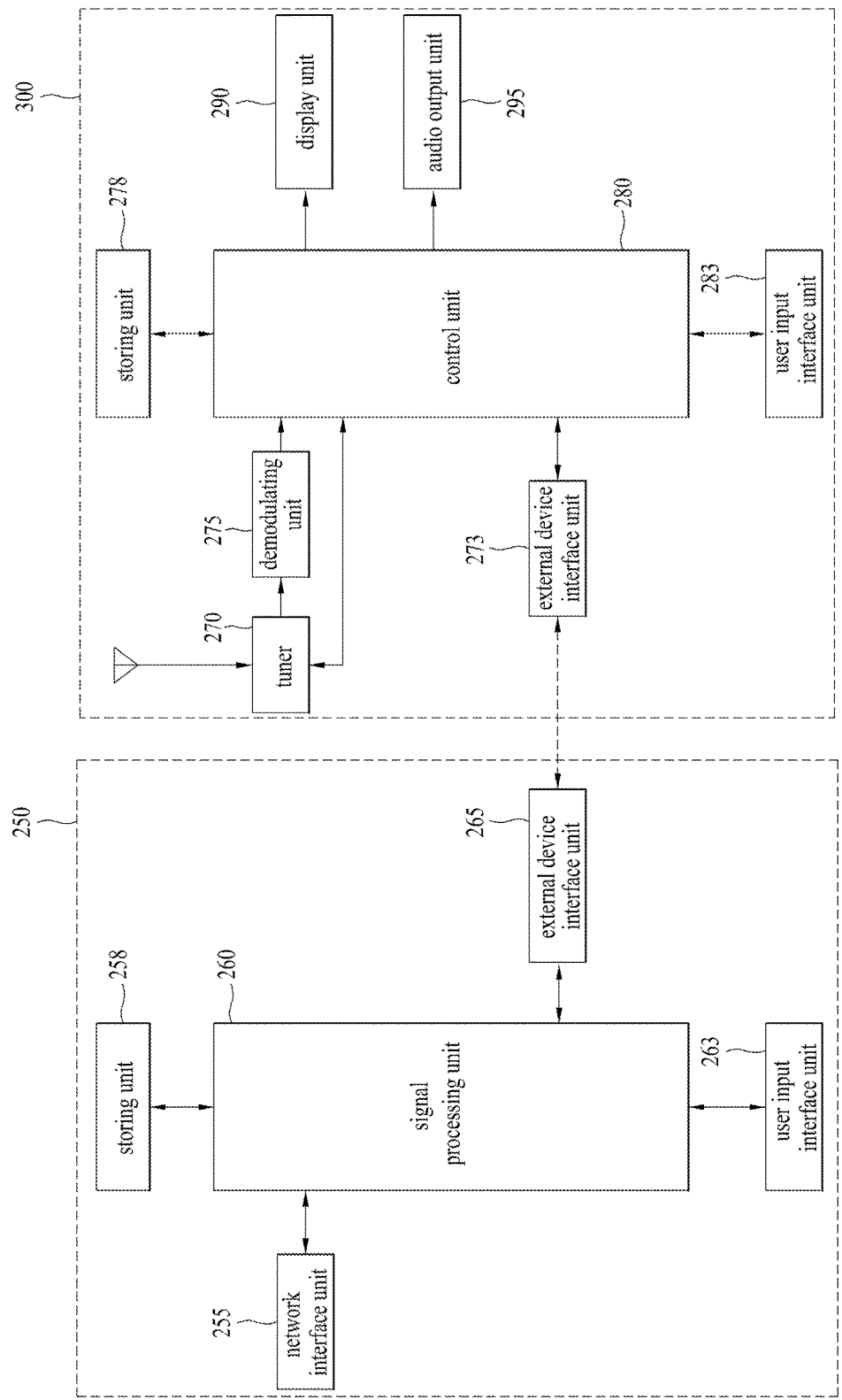
FIG. 7 and FIG. 8 are diagrams showing a prescribed one among image display devices according to embodiments of the present invention in a manner of dividing the prescribed one into a set top box and a display device.
Figure 8:
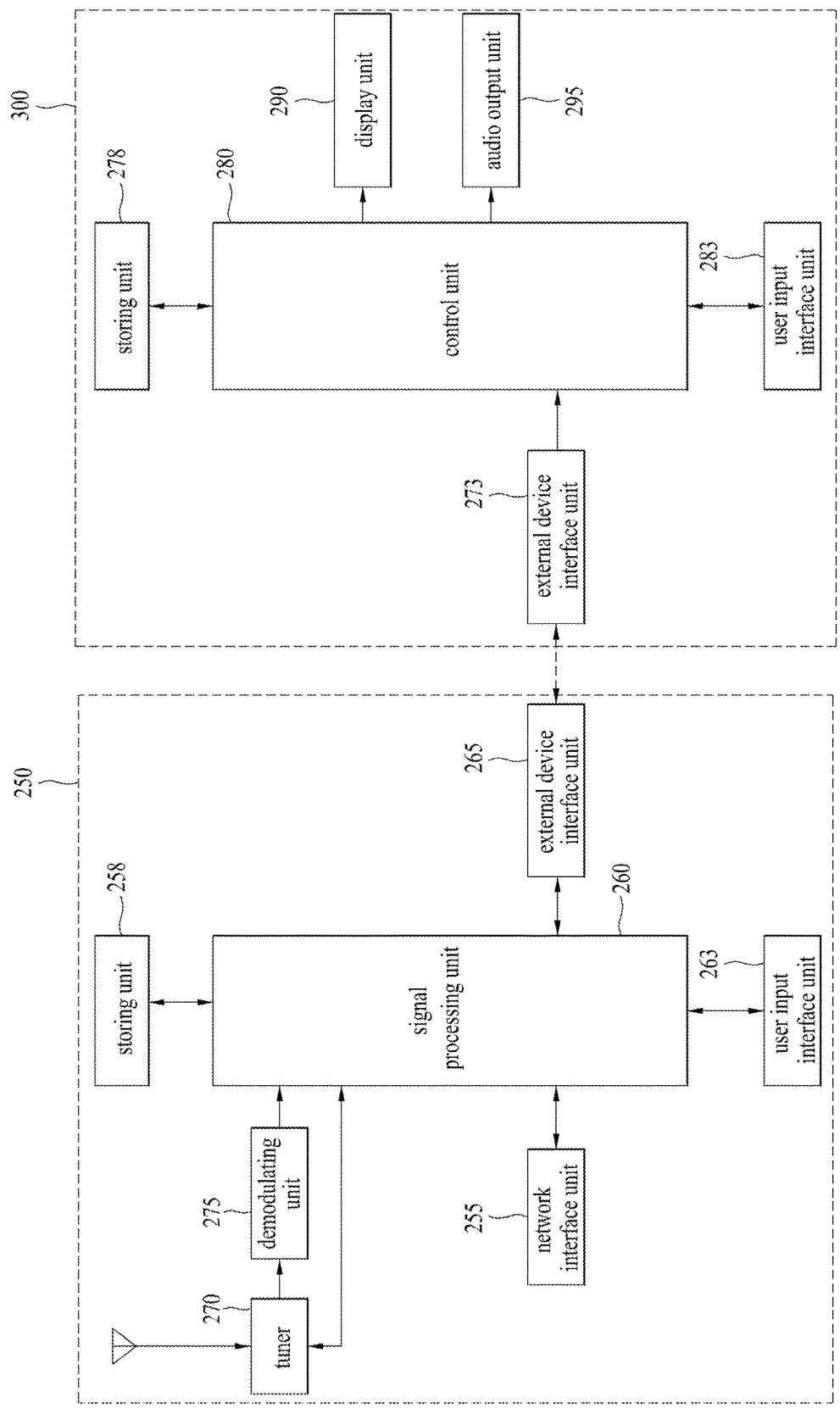

FIG. 7 and FIG. 8 are diagrams showing a prescribed one among image display devices according to embodiments of the present invention in a manner of dividing the prescribed one into a set top box and a display device.

First of all, referring to FIG. 7, a set top box 250 and a display device 300 can transmit and receive a data in wired or wireless.

The set top box 250 can include a network interface unit 255, a storing unit 258, a signal processing unit 260, a user input interface unit 263, and an external device interface unit 265.

The network interface unit 255 provides an interface configured to establish a connection to a wired/wireless network including the internet network. And, the network interface unit can transmit or receive a data with a different user or a different electronic device via an accessed network or a different network linked to the accessed network.

The storing unit 258 can store a program configured to process each signal in the signal processing unit 260 and may perform a function of temporarily storing an image, an audio, or a data signal inputted from the external device interface unit 265 or the network interface unit 255. And, the storing unit may store the platform described later with reference to FIG. 11 and FIG. 12.

The signal processing unit 260 performs a signal processing for an inputted signal. For instance, the signal processing unit performs demultiplexing or decoding for an inputted image signal and can perform demultiplexing or decoding for an inputted audio signal. To this end, the signal processing unit can be equipped with an image decoder or an audio decoder. A signal-processed image signal or an audio signal can be transmitted to the display device 300 via the external device interface unit 265.

The user input interface unit 263 delivers a signal inputted by a user to the signal processing unit 260 or delivers a signal from the signal processing unit 260 to the user. For instance, the user input interface unit receives such various control signals as power on/off, an operation input, a configuration input, and the like, which are inputted via a local key (not depicted) or the remote control device 200, and can deliver the control signals to the signal processing unit 260.

The external device interface unit 265 provides an interface configured to transceive a data with an external device, which is connected in wired or wireless. In particular, the external device interface unit provides the interface configured to transceive a data with the display device 300. Besides, the external device interface unit can provide the interface configured to transceive a data with such an external device as a gaming device, a camera, a camcorder, a computer (notebook), and the like.

Meanwhile, the set top box 250 can further include a media input unit (not depicted) configured to play a separate media. As an example of the media input unit, it is possible to exemplify a blue ray input unit (not depicted) and the like. In particular, the set top box 250 can be equipped with a blue ray player. After performing such a signal processing as demultiplexing or decoding in the signal processing unit 260, such a media as an inputted blue ray disk and the like can be transmitted to the display device 300 via the external device interface unit 265 to display the media.

The display device 300 can include a tuner 270, an external device interface unit 273, a demodulating unit 275, a storing unit 278, a control unit 280, a user input interface unit 283, a display unit 290, and an audio output unit 295.

Since the tuner 270, the demodulating unit 275, the storing unit 278, the control unit 280, the user input interface unit 283, the display unit 290, and the audio output unit 295 correspond to the tuner 110, the demodulating unit 120, the storing unit 140, the control unit 170, the user input interface unit 150, the display unit 180, and the audio output unit 185 depicted in FIG. 6, explanation for the aforementioned units is omitted.

Meanwhile, the external device interface unit 273 provides an interface configured to transceive a data with an external device accessed in wired or wireless. In particular, the external device interface unit provides the interface configured to transceive a data with the set top box.

By doing so, the external device interface unit makes an image signal or an audio signal inputted via the set top box 250 to be outputted via the display unit 180 or the audio output unit 185 by way of the control unit 170.

Meanwhile, referring to FIG. 8, although the set top box 250 and the display device 300 are identical to the set top box 250 and the display device 300 depicted in FIG. 7, there exist a difference in that a position of the tuner 270 and the demodulating unit 275 is located at not in the display device 300 but in the set top box 250. In the following description, it shall be described centering on the difference.

The signal processing unit 260 can perform a signal processing for a broadcasting signal received via the tuner 270 and the demodulating unit 275. And, the user input interface unit 263 can receive such an input as a channel selection, a channel saving, and the like.

Figure 9:
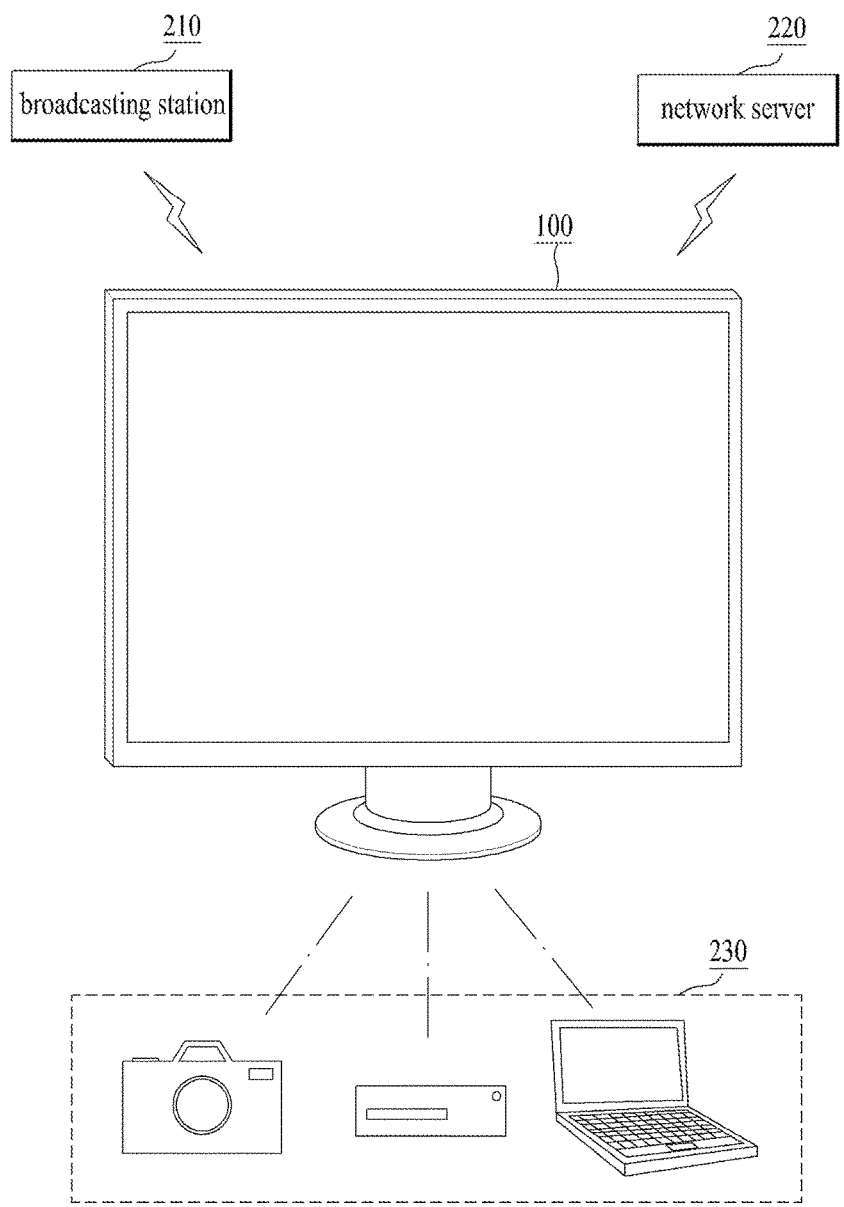
FIG. 9 is a diagram for explaining a process that a random one among image display devices according to embodiments of the present invention is communicating with the third devices.

FIG. 9 is a diagram for explaining a process that a random one among image display devices according to embodiments of the present invention is communicating with the third devices. An image display device shown in FIG. 9 may correspond to a prescribed one among the aforementioned image display devices according to embodiments of the present invention.

As shown in FIG. 9, the image display device 100 according to one embodiment of the present invention can communicate with a broadcasting station 210, a network server 220, or an external device 230.

The image display device 100 can receive a broadcasting signal including an image signal transmitted by the broadcasting station 210. The image display device 100 can process an image signal or an audio signal included in the broadcasting signal to be appropriate for outputting the image signal or the audio signal in the image display device 100. The image display device 100 can output an image or an audio based on the processed image signal.

Meanwhile, the image display device can communicate with the network server 220. The network server 220 is a device capable of transmitting and receiving a signal with the image display device via a random network. For instance, the network server 220 may correspond to a cellular phone terminal capable of being connected to the image display device 100 via a wired or wireless base station. And, the network server 220 may correspond to a device capable of providing content to the image display device 100 via the internet network. A content provider can provide the content to the image display device 100 using the network server.

Meanwhile, the image display device 100 can communicate with the external device 230. The external device 230 is a device capable of directly transceiving a signal with the image display device 100 in wired or wireless. As an example, the external device 230 may correspond to a media storing device or a playing device used by a user. In particular, the external device 230 corresponds to a camera, a DVD, a blue ray player, a personal computer, or the like.

The broadcasting station 210, the network server 220, or the external device 230 can transmit a signal including an image signal to the image display device 100. The image display device 100 can display an image based on the image signal included in the inputted signal. And, image display device 100 can transmit the signal transmitted by the broadcasting station 210 or the network server 220 to the image display device 100 to the external device 230. And, the image display device can transmit the signal transmitted by the external device 230 to the image display device 100 to the broadcasting station 210 or the network server 220. In particular, the image display device 100 not only directly plays the content included in the signal transmitted by the broadcasting station 210, the network server 220, and the external device 230 in the image display device 100 but also delivers the content to the broadcasting station, the network server, and the external device.

Figure 10:
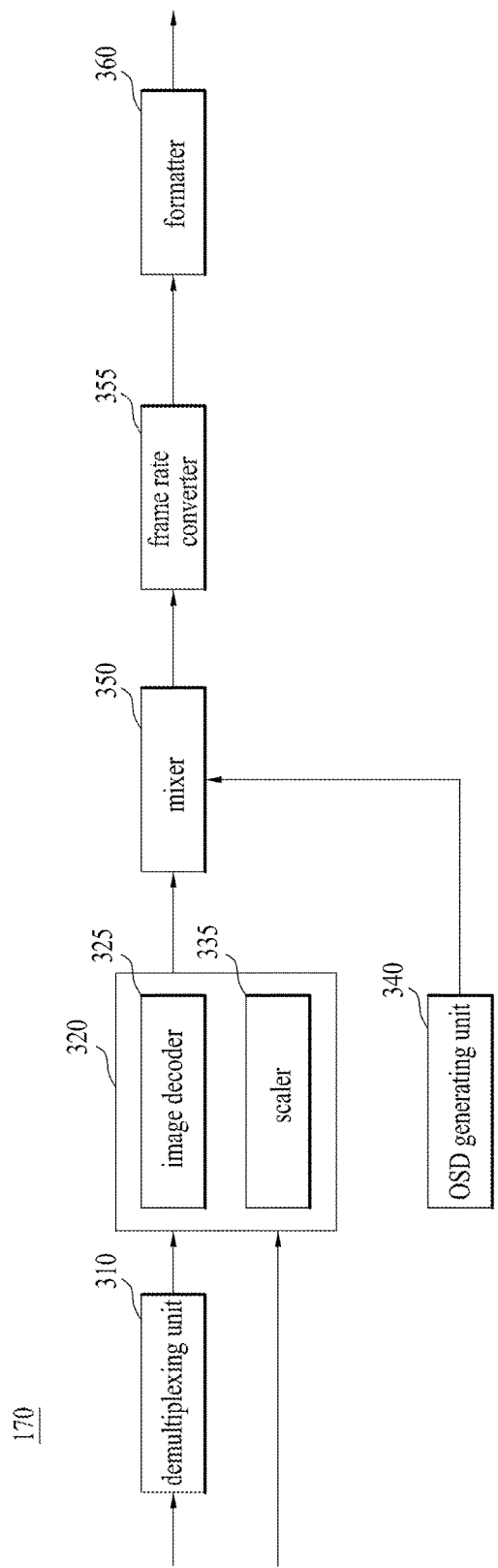
FIG. 10 is an internal block diagram of a control unit depicted in FIG. 6.

FIG. 10 is an internal block diagram of a control unit depicted in FIG. 6. It is explained with reference to FIG. 10 and FIG. 6 in the following description.

The control unit 170 according to one embodiment of the present invention includes a demultiplexing unit 310, an image processing unit 320, an OSD generating unit 340, a mixer 350, a frame rate converter 355, and a formatter 360. Besides, the control unit can further include an audio processing unit (not depicted) and a data processing unit (not processing).

The demultiplexing unit 310 demultiplexes an inputted stream. For instance, if MPEG-2 TS is inputted, the demultiplexing unit can classify the MPEG-2 TS into an image, an audio, and a data signal by demultiplexing the MPEG-2 TS. In this case, a stream signal inputted to the demultiplexing unit 310 may correspond to the stream signal outputted from the tuner 110, demodulating unit 120, or the external device interface unit 135.

The image processing unit 320 can perform an image processing for a demultiplexed image signal. To this end, the image processing unit 320 can be equipped with an image decoder 325 and a scaler 335.

The image decoder 325 decodes a demultiplexed image signal and the scaler 335 performs a scaling to enable the display unit 180 to output the resolution of a decoded image signal.

The image decoder 325 can be equipped with decoders of various standards.

For instance, if a demultiplexed image signal corresponds to a coded image signal of MPEG-2 standard, the demultiplexed image signal can be decoded by an MPEG-2 decoder.

And, if a demultiplexed image signal corresponds to a coded image signal of DMB (digital multimedia broadcasting) scheme or H.264 standard according to DVB-H, the demultiplexed image signal can be decoded by an H.264 decoder.

Meanwhile, the image signal decoded in the image processing unit 320 is inputted to the mixer 350.

The OSD generating unit 340 generates an OSD signal according to a user input or by itself. For instance, the OSD generating unit can generate a signal configured to display various informations in a screen of the display unit 180 with a graphic or a text based on a control signal from the user input interface unit 150. The OSD signal generated from the OSD generating unit can include various data such as a user interface screen of the image display device 100, various menu screens, a widget, an icon, and the like.

For instance, the OSD generating unit 340 can generate a signal configured to display a caption of a broadcasting image or broadcasting information based on EPG.

The mixer 350 can mix an OSD signal generated by the OSD generating unit 340 with a decoded image signal, which is image-processed in the image processing unit 220. A mixed signal is provided to the formatter 360. By mixing a decoded broadcasting image signal or an external input signal with an OSD signal, an OSD can be displayed on a broadcasting image or on an external input image in a manner of being overlaid.

The frame rate converter (FRC) 355 can convert a frame rate of an inputted image. For instance, the frame rate converter converts a frame rate of 60 Hz to 120 Hz or 240 Hz. In case of converting the frame rate from 60 Hz to 120 Hz, it is able to insert an identical $1^{st}$ frame between the $1^{st}$ frame and a $2^{nd}$ frame or it is able to insert a $3^{rd}$ frame, which is predicted from the $1^{st}$ and $2^{nd}$ frame, between the $1^{st}$ and $2^{nd}$ frame. In case of converting the frame rate from 60 Hz to 240 Hz, it is able to insert 3 more identical frames or it is able to insert 3 predicted frames between the $1^{st}$ frame and the $2^{nd}$ frame. Meanwhile, it is also possible to maintain an inputted frame rate without any separate converting.

The formatter 360 receives an output signal of the frame rate converter 355 and outputs a signal by changing a format of the signal to be suitable for the display unit 180. For instance, the formatter can output R, G, B data signal. The R, G, B data signal can be outputted by a low voltage differential signaling (LVDS) or a mini-LVDS.

Meanwhile, the audio processing unit (not depicted) in the control unit 170 can perform an audio processing for a demultiplexed audio signal. To this end, the audio processing unit (not depicted) can be equipped with various decoders.

If a demultiplexed audio signal corresponds to a coded audio signal, the audio processing unit (not depicted) in the control unit 170 can decode the demultiplexed audio signal. For instance, the demultiplexed audio signal can be decoded by an MPEG-2 decoder, an MPEG-4 decoder, an AAC decoder, or an AC-3 decoder.

And, the audio processing unit (not depicted) in the control unit 170 can process a base, a treble, volume adjustment, and the like.

The data processing unit (not depicted) in the control unit 170 can perform a data process for a demultiplexed data signal. For instance, if the demultiplexed data signal corresponds to a coded data signal, the data processing unit can decode the demultiplexed data signal. The coded data signal may correspond to an electronic program guide (EPG) information including such broadcasting information as a start time of a broadcasting program broadcasted in each channel, end time, and the like. For instance, the EPG information may correspond to ATSC-PSIP (ATSC-program and system information protocol) information in case of the ATSC scheme and may include DVB-SI (DVB-service information) information in case of the DVB scheme.

The ATSC-PSIP information or the DVB-SI information may correspond to the information included in the aforementioned stream, in particular, the information included in a header (4 bytes) of the MPEG-2 TS.

Meanwhile, since the block diagram of the control unit 170 depicted in FIG. 10 is a block diagram for one embodiment of the present invention, it is possible to add a different module or omit a part of the depicted modules according to a necessity of a person engaged in a relevant field.

Figure 11:
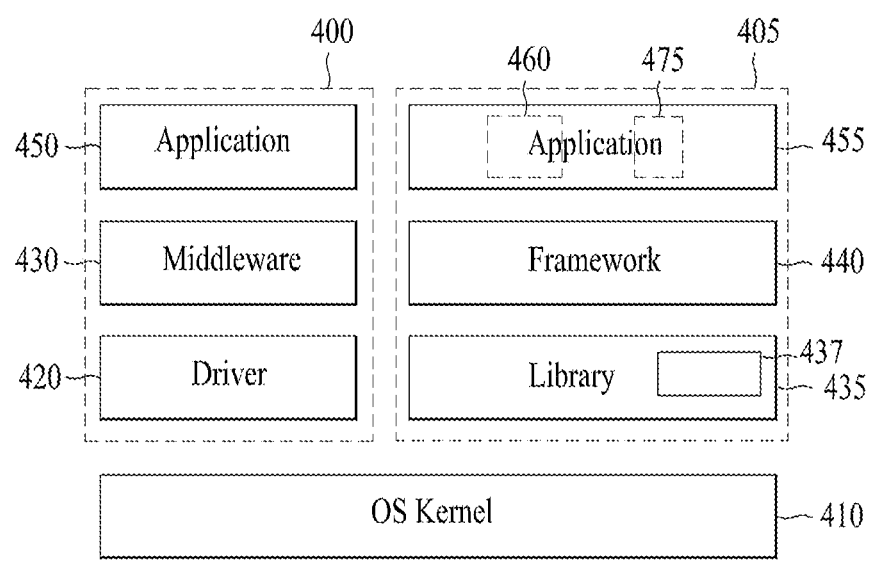
FIG. 11 is a diagram of an example of a platform structure of a random one among image display devices according to embodiments of the present invention.

FIG. 11 is a diagram of an example of a platform structure of a random one among image display devices according to embodiments of the present invention.

Figure 12:
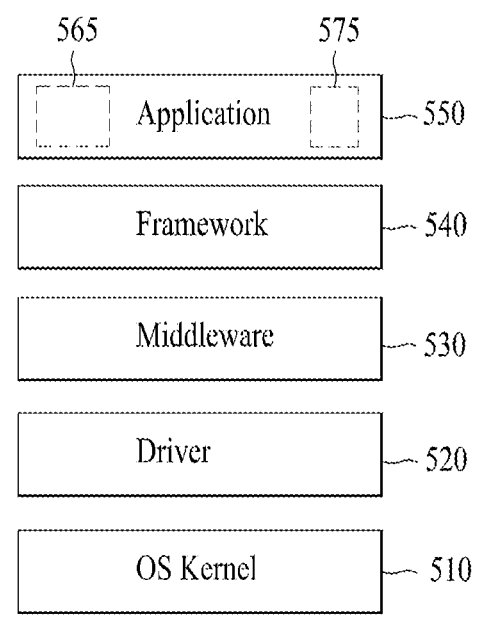
FIG. 12 is a diagram of a different example of a platform structure of a random one among image display devices according to embodiments of the present invention.

FIG. 12 is a diagram of a different example of a platform structure of a random one among image display devices according to embodiments of the present invention.

A platform of a random one among the image display devices according to embodiments of the present invention can be equipped with OS-based software to perform the aforementioned various operations.

First of all, if it is explained with reference to FIG. 11, a random platform among the image display devices according to embodiments of the present invention corresponds to a discrete type platform and it can be designed in a manner of dividing into a legacy system platform 400 and a smart system platform 405. An OS kernel 410 can be commonly used by the legacy system platform and the smart system platform 405.

The legacy system platform 400 can include a driver 420, a middleware 430, and an application layer 450 on the OS kernel 410.

Meanwhile, the smart system platform 405 can include a library 435, a framework 440, and an application layer 455 on the OS kernel 410.

The OS kernel is a core of an operating system. When the image display device works, the OS kernel can perform at least one selected from the group consisting of a hardware driver operation, security of a hardware and a processor in the image display device, efficient management of a system resource, a memory management, providing an interface for the hardware by hardware abstraction, multi process, a schedule management according to the multi process, and the like. Meanwhile, the OS kernel 410 may further provide a power management and the like.

The hardware driver in the OS kernel 410 can include at least one selected from the group consisting of a display driver, a WiFi driver, a Bluetooth driver, a USB driver, an audio driver, a power management, a binder driver, a memory driver, and the like.

And, the hardware driver in the OS kernel 410 is a driver for a hardware device in the OS kernel 410 and can be equipped with a character device driver, a block device driver, and a network device driver. Since a data is transmitted in a specific block unit, the block device driver may need a buffer to store as much as a unit size. Unlike the block device driver, the character device driver may not need a buffer since a basic data unit, i.e., character unit of data is transmitted.

The OS kernel 410 can be implemented by the kernel based on such various operating systems (OS) as a UNIX based (LINUX), a window based, and the like. And, since the OS kernel 410 is an opened OS kernel, the OS kernel can be used as a general purpose OS by a different electronic device and the like.

The driver 420 is situated at between the OS kernel 410 and the middleware 430 and drives a device for operations of the application layer 450 together with the middleware 430. For instance, the driver 420 can include the driver of a micom in the image display device, a display module, a graphic processing unit, a frame rate converter (FRC), a GPIO (General Purpose Input/Output Pin), HDMI, SDEC (System Decoder or the demultiplexing unit), VDEC (Video Decoder), ADEC (Audio Decoder), PVR (Personal Video Recorder), I2C (Inter-Integrated Circuit), or the like. These drivers are working in a manner of interlocking with a hardware driver in the OS kernel 410.

And, the driver 420 can be further equipped with the remote control device 200, in particular, a driver of a spatial remote controller, which shall be described in the following description. Meanwhile, the driver of the spatial remote controller can be variously installed in the OS kernel 410, the middleware 430 as well as the driver 420.

The middleware 430 is situated at between the OS kernel 410 and the application layer 450 and can play a role of mediating to make a data to be transceived with different hardware or software. By doing this, it is possible to provide a standardized interface, to support various environments and to interlock with a task having a different system.

The example of the middleware within the legacy system platform 400 may include a MHEG (Multimedia and Hypermedia information coding Experts Group) and an ACAP (Advanced Common Application Platform), which correspond to the middleware related to a data broadcasting and the middleware of PSIP or SI, which correspond to the middleware related to a broadcasting information, and a DLNA middleware, which corresponds to the middleware related to a peripheral device communication.

The application layer 450 on the middleware 430, in particular, the application layer 450 within the legacy system platform 400 can include a user interface application for various menus in the image display device 100. The application layer 450 on the middleware 430 can be edited by a user selection and can be updated via a network. It is able to enter a preferred menu among the various user interfaces according to an input of the remote control device while a broadcasting image is watched by using the aforementioned application layer 450.

And, the application layer 450 within the legacy system platform 400 can further include at least one selected from the group consisting of a TV guide application, a Bluetooth application, a reservation application, a digital video recorder (DVR) application, a hot key application.

Meanwhile, the library 435 within the smart system platform 405 is situated at between the OS kernel 410 and the framework 440 and can form a basis of the framework 440. For instance, the library 435 can include a security-related library SSL (Secure Socket Layer), a web-engine related library WebKit, a media-related (video format and audio format) library media frame work, and the like. This library 435 can be made based on C or C++. And, the library can be exposed to a developer.

The library 435 can include a runtime 437 equipped with a core java library and a virtual machine (VM). The runtime 437 forms the basis of the framework 440 together with the library 435.

The virtual machine (VM) may correspond to a virtual machine making a plurality of instances, i.e., multitasking to be performed. Meanwhile, each virtual machine (VM) can be executed in a manner of being assigned according to each application in the application layer 455. In this case, the binder driver (not depicted) in the OS kernel 410 can operate to adjust a schedule or to interconnect between a plurality of instances.

Meanwhile, the binder driver and the runtime 437 can connect a java-based application to a C-based library.

Meanwhile, the library 435 and the runtime 437 may correspond to the middleware of the legacy system.

Meanwhile, the framework 440 in the smart system platform includes a program, which becomes a basis of an application in the application layer 455. The framework 440 can be compatible with any application and may be able to re-use, move, or exchange a component. The framework 440 can include a supporting program, a program for weaving different software configuration elements, and the like. For instance, the framework can include a resource manager, an activity manager related to an activity of an application, a notification manager, a content provider summarizing shared information between applications, and the like. The frame work 440 can be made based on java.

The application layer 455 on the framework 440 includes various programs displayable in the image display device 100 in a manner of being executed. For instance, the application layer can include a core application, which is equipped with at least one selected from the group consisting of an email, a short message service (SMS), a calendar, a map, a browser, and the like. The application layer 450 can be made based on java.

And, the application layer 455 can be classified into an application 465 not capable of being deleted by a user since the application is stored within the image display device 100 and an application 475 stored in a manner of being downloaded by an external device or a network and capable of being easily installed or deleted by the user.

Via the application in the application layer 455, an internet phone service, a video on demand (VOD) service, a web album service, a social networking service (SNS), a location based service (LBS), a map service, a web search service, an application search service, and the like can be performed by accessing a network. And, various functions such as a game, a schedule management, etc. can be performed.

Meanwhile, referring to FIG. 12, a random platform among the image display devices according to one embodiment of the present invention corresponds to an integrated type platform and can include an OS kernel 510, a driver 520, a middleware 530, a framework 540 and an application layer 550.

The platform in FIG. 12 has differences in that the library depicted in FIG. 11 is omitted and the application layer 550 is equipped with an integrated layer compared to the platform in FIG. 11. The driver 520 and the framework 540 correspond to the FIG. 11.

Meanwhile, it is possible to design the library 435 depicted in FIG. 11 to be amalgamated to the middleware 530 depicted in FIG. 12. In particular, the middleware 530 can include the MHEG or the ACAP, which correspond to the middleware related to a data broadcasting and the middleware of PSIP or SI, which correspond to the middleware related to a broadcasting information, and a DLNA middleware, which corresponds to the middleware related to a peripheral device communication as the middleware under the legacy system as well as a security-related library SSL (Secure Socket Layer), a web-engine related library WebKit, a media-related library media frame work, and the like as the middleware under an image display device system. Meanwhile, the middleware can further include the aforementioned runtime.

The application layer 550 includes a menu-related application, a TV guide application, a reservation application, and the like as the application under the legacy system and can include an email, an SMS, a calendar, a map, a browser, and the like as the application under the image display device system.

Meanwhile, the application layer 550 can be classified into an application 565 not capable of being deleted by a user since the application is stored within the image display device 100 and an application 575 stored in a manner of being downloaded by an external device or a network and capable of being easily installed or deleted by the user.

Meanwhile, various API (application programming interface) and SDK (software development kit) can be opened by the aforementioned platform base in FIG. 11 and FIG. 12. Meanwhile, the API can be implemented in a manner of calling a function providing a connection to a specific subroutine to be executed in a program.

For instance, it is possible to open such a source related to the hardware driver in the OS kernel 410 as a display driver, a WiFi driver, a Bluetooth driver, a USB driver, an audio driver, or the like, to open such a source related to the driver 420 as a micom, a display module, a graphic processing unit (GPU), a frame rate converter (FRC), an SDEC, a VDEC, an ADEC, a spatial remote controller, or the like, or to open such a source related to broadcasting information as PSIP or SI middleware or such a source related to the DLNA middleware.

Due to the various opened APIs, a developer and the like are able to develop an application executing in the image display device 100 or an application configured to control the operations of the image display device 100 based on the aforementioned platform depicted in FIG. 11 and FIG. 12.

The aforementioned platform depicted in FIG. 11 and FIG. 12 can be commonly used in various electronic devices as well as the image display device. Meanwhile, the platform depicted in FIG. 11 and FIG. 12 can be stored or loaded in the storing unit 140 depicted in FIG. 6, control unit 170, or a separate processor (not depicted). And, the platform can be stored or loaded in the SI & metadata DB 711 depicted in FIG. 5, the UI manager 714, or the service manager 713. And, a separate application processor (not depicted) configured to execute an application can be further installed.

Figure 13:
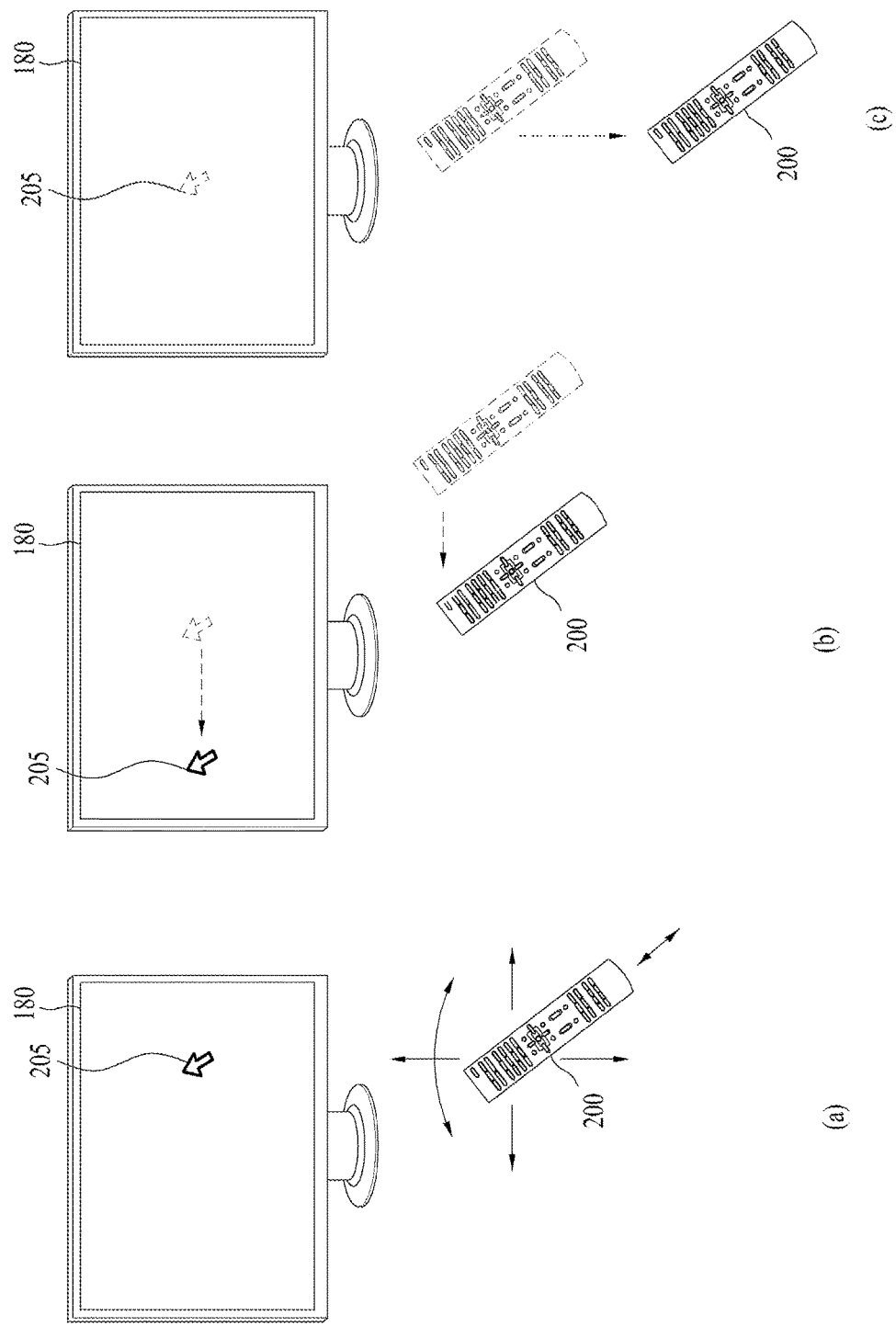
FIG. 13 is a diagram of a method of controlling a remote control device controlling a random one among image display devices according to embodiments of the present invention.

FIG. 13 is a diagram of a method of controlling a remote control device controlling a random one among image display devices according to embodiments of the present invention.

As shown in FIG. 13 (a), it exemplifies that a pointer 205 corresponding to a remote control device 200 is displayed in the display unit 180.

A user can move or rotate the remote control device 200 up and down, from side to side (FIG. 13 (b)), or back and forth (FIG. 13 (c)). The pointer 205 displayed in the display unit 180 of the image display device corresponds to the movement of the remote control device 200. As shown in FIG. 13, since the corresponding pointer 205 is displayed in the display unit according to the movement of the remote control device 200 in a 3 dimensional (3D) space, the remote control device can be named a spatial remote controller.

FIG. 13 (b) exemplifies that the pointer 205 displayed in the display unit 180 of the image display device moves to the left, if a user moves the remote control device 200 to the left.

Information on the movement of the remote control device 200, which is sensed by a sensor of the remote control device 200, is transmitted to the image display device. The image display device can calculate a coordinate of the pointer 205 from the information on the movement of the remote control device 200. The image display device can display the pointer 205 in a manner of corresponding to the calculated coordinate.

FIG. 13 (c) exemplifies that a user moves the remote control device 200 away from the display unit 180 in a state that the user is pushing a specific button in the remote control device 200. By doing so, a selected area in the display unit 180 corresponding to the pointer 205 is zoomed in and can be displayed in a manner of being expanded. On the contrary, if the user moves the remote control device 200 close to the display unit 180, the selected area in the display device 180 corresponding to the pointer 205 is zoomed out and can be displayed in a manner of being reduced in size. Meanwhile, if the remote control device 200 moves away from the display unit 180, the selected area is zoomed out, if the remote control device moves close to the display unit 180, the selected area is zoomed in.

Meanwhile, in a state that a user is pushing a specific button in the remote control device 200, recognition for moving from side to side or moving up and down of the remote control device can be excluded. In particular, in case that the remote control device 200 moves back and forth from the display unit 180, it is able to make the back and forth movement of the remote control device to be recognized only while the movement of up and down or the movement from side to side is not recognized. In a state that a specific button in the remote control device 200 is not pushed, the pointer 205 just moves according to the movement of up and down or the movement from side to side of the remote control device 200.

Meanwhile, moving speed or moving direction of the pointer 205 can correspond to the moving speed or the moving direction of the remote control device 200.

Meanwhile, the pointer of the present specification means an object displayed in the display unit 180 in response to an operation of the remote control device 200. Hence, it is possible to use an object of various forms besides an arrow form depicted in FIG. 13 as the pointer 205. For instance, the pointer may correspond to a concept including a point, a cursor, a prompt, a thick border line, and the like. And, the pointer 205 can be displayed in a manner of corresponding to such a plurality of points as a line, a surface, and the like as well as displayed in a manner of corresponding to a prescribed point among a horizontal axis and a vertical axis on the display unit 180.

Figure 14:
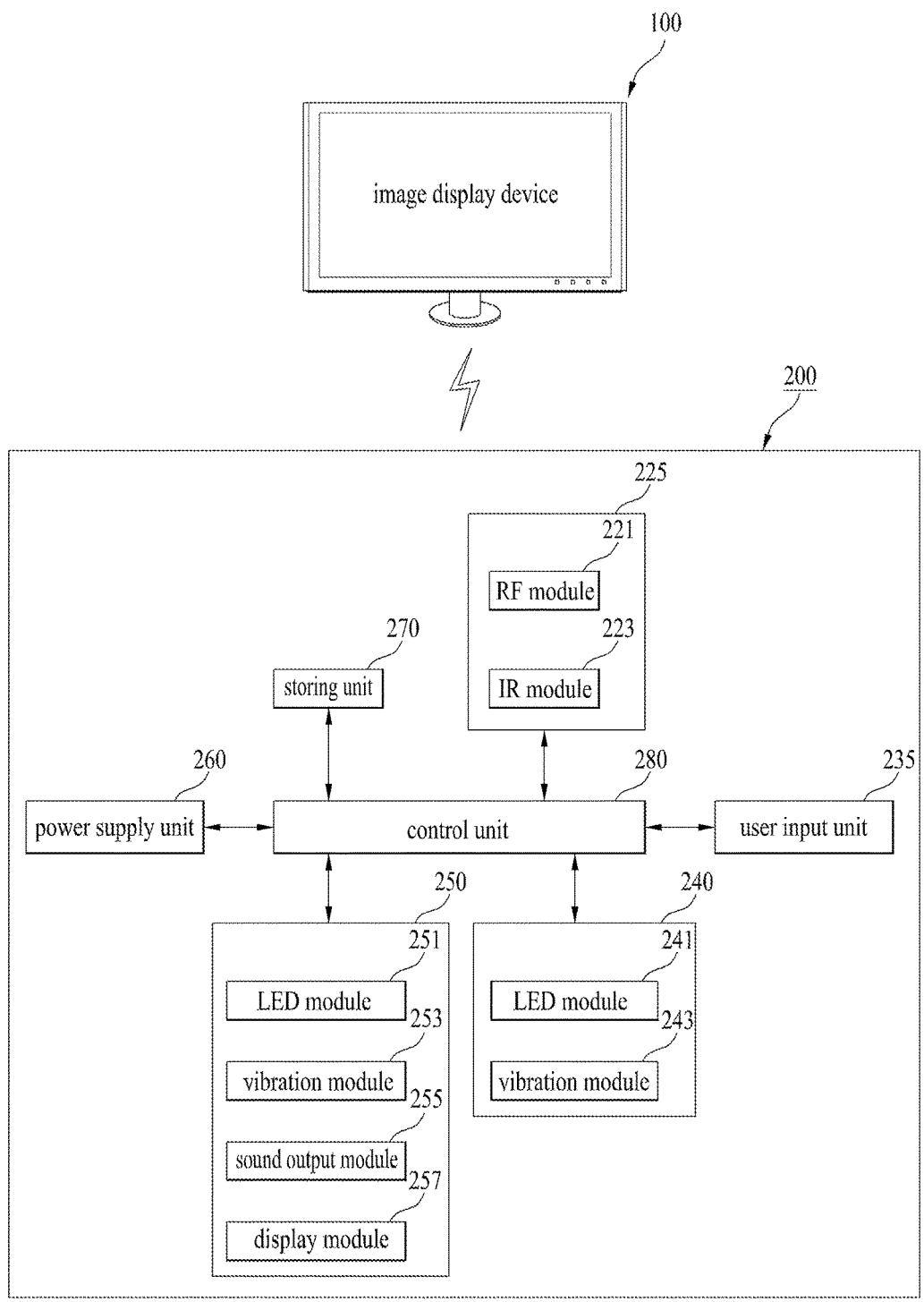
FIG. 14 is an internal block diagram of a remote control device controlling a random one among image display devices according to embodiments of the present invention.

FIG. 14 is an internal block diagram of a remote control device controlling a random one among image display devices according to embodiments of the present invention.

Referring to FIG. 14, the remote control device 200 can include a radio communication unit 225, a user input unit 235, a sensor unit 240, an output unit 250, a power supply unit 260, a storing unit 270, and a control unit 280.

The radio communication unit 225 transceives a signal with a random one of the aforementioned image display devices according to embodiments of the present invention. Among the image display devices according to embodiments of the present invention, one image display device 100 is explained as an example.

According to the present embodiment, the remote control device 200 can be equipped with an RF module 221 capable of transceiving a signal with the image display device according to an RF communication standard. And, the remote control device 200 can be equipped with an IR module 223 capable of transceiving a signal with the image display device 100 according to an IR communication standard.

According to the present embodiment, the remote control device 200 transmits a signal including information on movement of the remote control device 200 and the like to the image display device 100 via the RF module 221.

And, the remote control device 200 can receive the signal transmitted by the image display device 100 via the RF module 221. And, the remote control device 200 can transmit a command for power on/off, channel switching, volume control, and the like to the image display device 100 via the IR module, if necessary.

The user input unit 235 can consist of a key pad, a button, a touch pad, a touch screen, or the like. A user can input a command related to the image display device 100 to the remote control device 200 in a manner of controlling the user input unit 235. If the user input unit 235 is equipped with a hard key button, the user can input a command related to the image display device 100 to the remote control device 200 via a push operation of the hard key button. If the user input unit 235 is equipped with the touch screen, the user can input a command related to the image display device 100 to the remote control device 200 in a manner of touching a soft button of the touch screen. And, the user input unit 235 can be equipped with such various input means capable of being operated by the user as a scroll key, a jog key, or the like and the present embodiment does not limit the scope of right of the present invention.

The sensor unit 240 can be equipped with a gyro sensor 241 or an acceleration sensor 243.

The gyro sensor 241 can sense information on the movement of the remote control device 200.

As an example, the gyro sensor 241 can sense the information on the operation of the remote control device 200 on the basis of x, y, and z axis. The acceleration sensor 243 can sense information on the moving speed and the like of the remote control device 200. Meanwhile, the sensor unit can be further equipped with a distance measurement sensor and can sense a distance from the display unit 180 by the distance measurement sensor.

The output unit 250 corresponds to an operation of the user input unit 235 or can output an image or an audio corresponding to a signal transmitted by the image display device 100. Via the output unit 250, a user can identify whether the user input unit 235 operates or whether the image display device 100 controls.

As an example, the output unit 250 can be equipped with a LED module 251, which is lighted if the user input unit 235 operates or if a signal is transceived with the image display device 100 via the radio communication unit 225, a vibration module 253 generating a vibration, a sound output module 255 outputting a sound, or a display module 257 outputting an image.

The power supply unit 260 supplies power to the remote control device 200. If the remote control device 200 does not move for a prescribed time period, the power supply unit 260 stops supplying power, thereby reducing power waste of the remote control device. The power supply unit 260 can resume the power supply in case that a prescribed key installed in the remote control device 200 is operated.

The storing unit 270 can store various programs necessary for controlling or operating the remote control device 200, an application data, and the like. If the remote control device 200 tranceives a signal via the image display device 100 and the RF module 221 in wireless, the remote control device 200 and the image display device 100 transmit and receive the signal via a prescribed frequency band. The control unit 280 of the remote control device 200 can store and reference the information on a frequency band capable of transceiving a signal in wireless with the image display device 100 paired with the remote control device 200, and the like in the storing unit 270.

The control unit 280 controls all the matters related to a control of the remote control device 200. The control unit 280 can transmit a signal corresponding to the operation of a prescribed key of the user input unit 235 or a signal corresponding to the movement of the remote control device 200, which is sensed by the sensor unit 240, to the image display device 100 via the radio communication unit 225.

Figure 15:
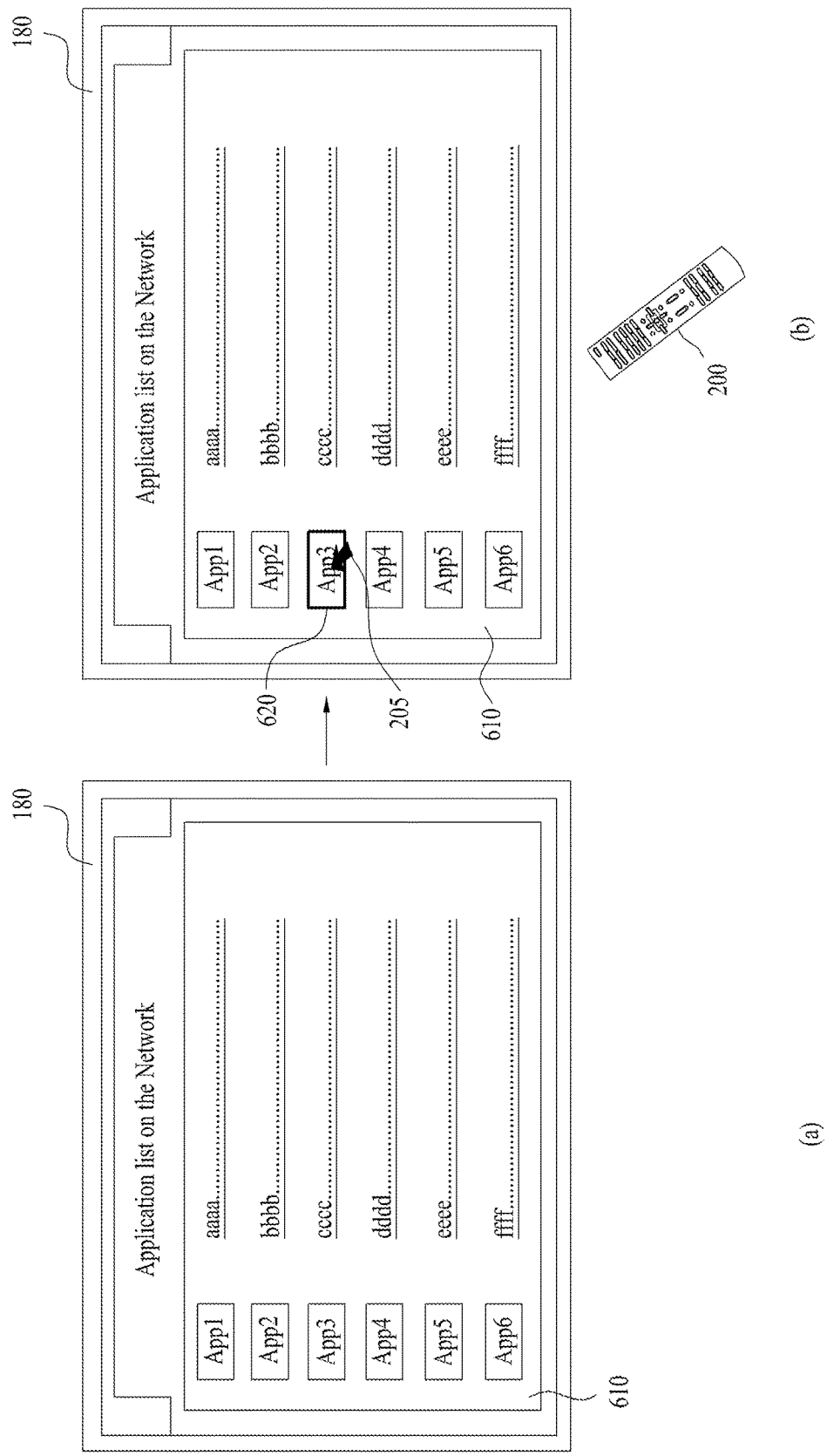
FIG. 15 is a diagram of a $1^{st}$ embodiment of a user interface provided by a random one among image display devices according to embodiments of the present invention.

FIG. 15 is a diagram of a $1^{st}$ embodiment of a user interface provided by a random one among image display devices according to embodiments of the present invention.

Figure 16:
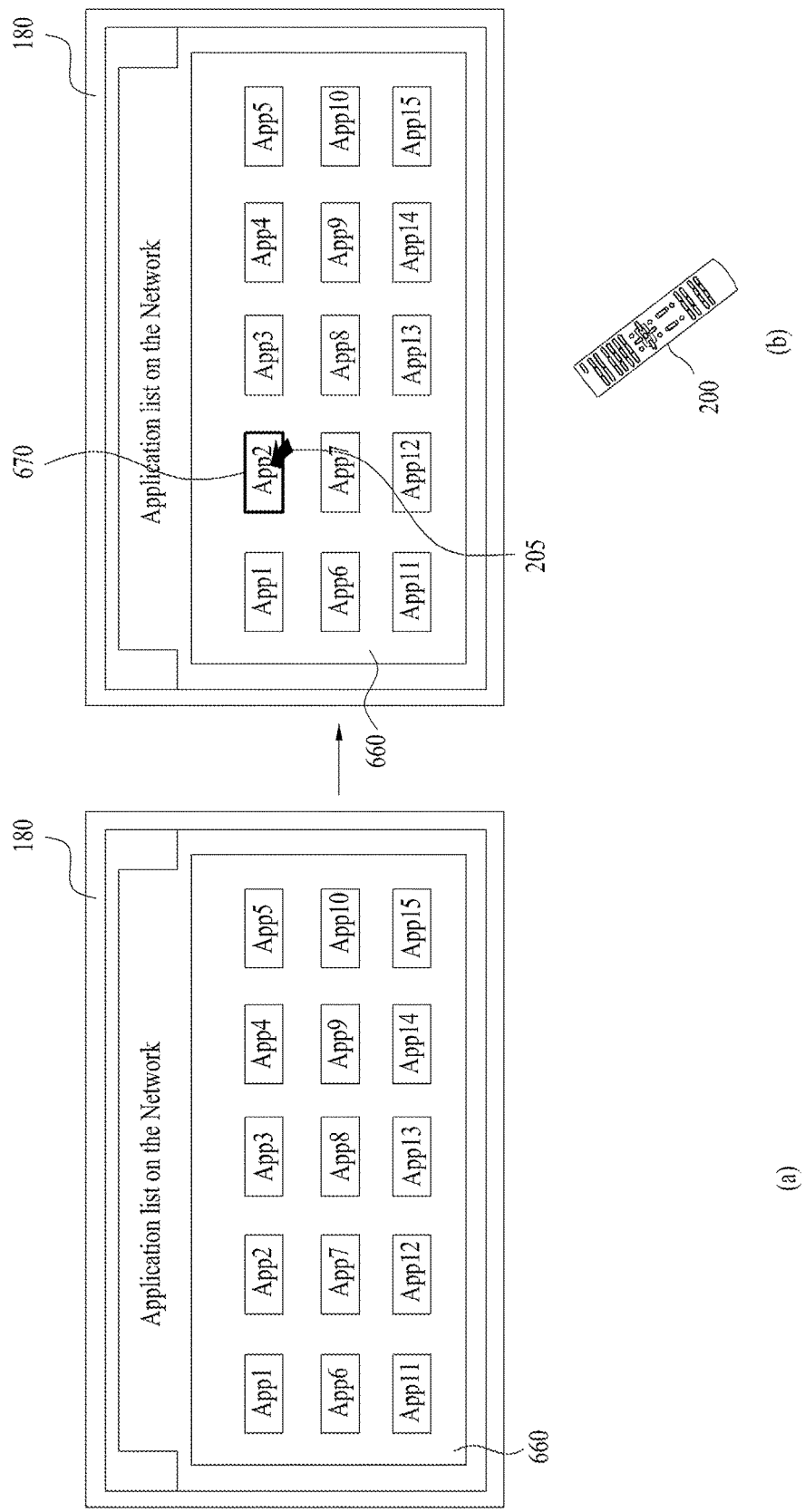
FIG. 16 is a diagram of a $2^{nd}$ embodiment of a user interface provided by a random one among image display devices according to embodiments of the present invention.

FIG. 16 is a diagram of a $2^{nd}$ embodiment of a user interface provided by a random one among image display devices according to embodiments of the present invention.

Figure 17:
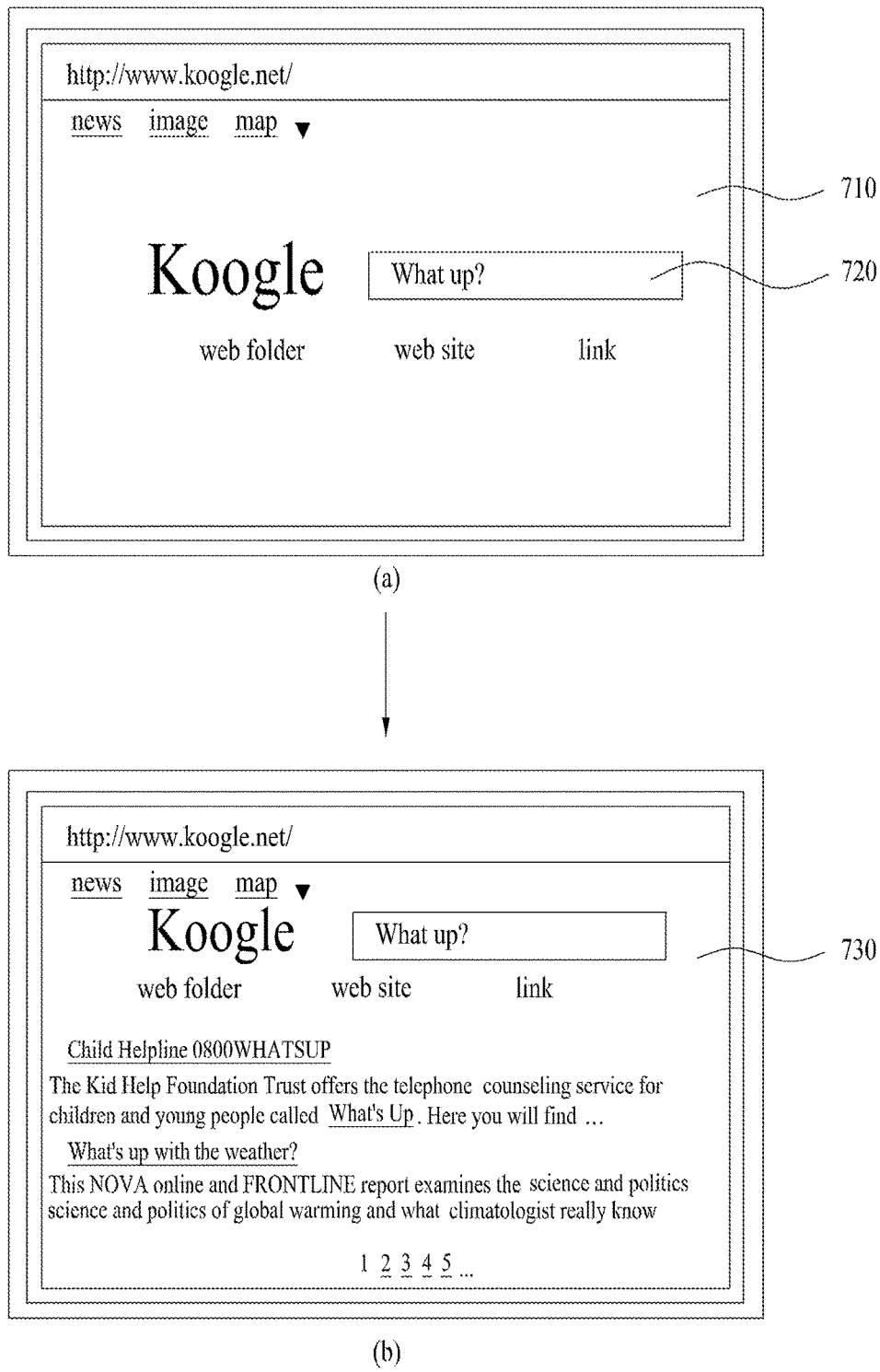
FIG. 17 is a diagram of a $3^{rd}$ embodiment of a user interface provided by a random one among image display devices according to embodiments of the present invention.

FIG. 17 is a diagram of a $3^{rd}$ embodiment of a user interface provided by a random one among image display devices according to embodiments of the present invention.

FIG. 18 is a diagram of a $4^{th}$ embodiment of a user interface provided by a random one among image display devices according to embodiments of the present invention.

FIG. 15 exemplifies that an application list on a network is displayed in the display unit 180. In particular, it is possible for a user to download an application after searching for various applications in a manner of directly accessing a corresponding content server or a network server.

FIG. 15 (a) exemplifies that various application lists 610 in an accessed server are displayed in the display unit 180. The application list 610 can include an icon indicating each application and brief explanation information on each application. Meanwhile, the image display device according to embodiments of the present invention can display the icon received from the accessed server or the size of the explanation information in a manner of expanding, since a full browsing for the image display device is possible. By doing so, a user can easily identify an application item. This shall be described later.

FIG. 15 (b) exemplifies that an application item 620 of a corresponding application list 610 is selected using a pointer 205 of the remote control device 200. By doing so, a corresponding application can be easily downloaded.

Meanwhile, FIG. 16 exemplifies that an application list in the image display device is displayed in the display unit 180. First of all, FIG. 16 (a) exemplifies that the application list 660 stored in the image display device according to embodiments of the present invention is displayed in the display unit 180 in case that a user enters an item of an application list view. Although the icons indicating each application are depicted in the diagram, this may be non-limited and may include brief explanation information on each application like as shown in FIG. 15. By doing so, a user can easily identify the application item.

FIG. 16 (b) exemplifies that an application item 670 of a corresponding application list 660 is selected using a pointer 205 of the remote control device 200. By doing so, a corresponding application is conveniently executed.

Meanwhile, although it is exemplified that a prescribed item is selected in a manner of moving a pointer 205, which moves according to the movement of a user, by the aforementioned remote control device 200 depicted in FIG. 15 and FIG. 16, embodiment of the present invention may be non-limited to this and various different examples are also available. For instance, a prescribed item can be selected using a cursor displayed in a screen by a combination of a direction key and a confirmation key arranged to the remote control device 200 or a local key (not depicted).

And, as a different example, in case that the remote control device is equipped with a touch pad, the pointer 205 moves on the display unit 180 by a touch operation on the touch pad. It is also possible to select a prescribed item using the pointer.

Meanwhile, FIG. 17 exemplifies that a web screen is displayed in the display unit of the image display device.

First of all, FIG. 17 (*a*) exemplifies that a searchable prescribed web screen 710 equipped with a search bar 720 is displayed in the display unit 180. A user can input a prescribed character in the search bar 720 using a key pad (not depicted) displayed in the screen, a letter key (not depicted) installed in a local key (not depicted), or the remote control device equipped with a letter key (not depicted).

FIG. 17 (*b*) exemplifies that a search result screen 730 according to a search word inputted in the search bar is displayed in the display unit 180. Since the image display device according to embodiment of the present invention is able to perform a full browsing in case of displaying a web screen, a user can easily identify the web screen.

Meanwhile, FIG. 18 exemplifies that a web screen is displayed in the display unit of the image display device.

First of all, FIG. 18 (*a*) exemplifies that a mail service screen 810 equipped with an ID input bar 820 and a password input bar 825 is displayed in the display unit 180. A user can input a prescribed character in the ID input bar 820 and the password input bar 825 using a key pad (not depicted) displayed in the screen, a letter key (not depicted) installed in a local key (not depicted), or the remote control device equipped with a letter key (not depicted). By doing so, the user can log in to a corresponding mail service.

FIG. 18 (*b*) exemplifies that a screen 830 after logging in to the mail service is displayed in the display unit 180. For instance, such an item as a 'read mail', a 'write mail', a 'sent box', a 'received box', a 'recycle bin', and the like can be exemplified. And, a mail can be displayed in a manner of being classified into a 'sender' and a 'title' item in the 'received box' item.

Since the image display device according to embodiment of the present invention is able to perform a full browsing in case of displaying a mail service screen, a user can conveniently use the mail service.

Figure 19:
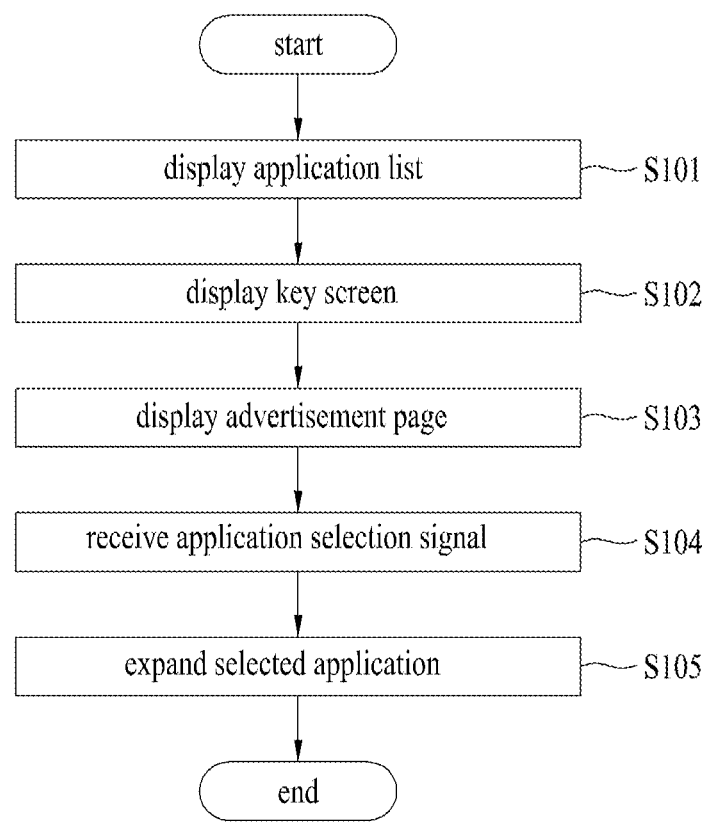
FIG. 19 is a flowchart for a method of providing an application menu of an image display device according to embodiment of the present invention.

FIG. 19 is a flowchart for a method of providing an application menu of an image display device according to embodiment of the present invention.

According to embodiment, the image display device can display an application list including application execution menu item in a manner of searching for an application available in the image display device [S101].

The application available in the image display device can include the application installed in the image display device according to one embodiment. Hence, the image display device searches for the storing unit or the control unit of the image display device and finds out which application is installed in the image display device. And, the image display device can display the application list including the application execution item of the application installed in the image display device based on the search result.

And, according to a different embodiment, the application available in the image display device can include an application installable in the image display device. Hence, the image display device searches a network accessed prescribed server for an application installable in the image display device in a network via the network interface unit. Based on the search result, the image display device can display the application list including the application execution item of the application installable in the image display device via the network.

As a means of connecting the network, a wired/wireless network including the internet network can be used. In particular, as a wired network, Ethernet and the like can be used for example. As a wireless network, WLAN (Wireless LAN) (Wi-Fi), Wibro (Wireless broadband), Wimax (World Interoperability for Microwave Access), HSDPA (High Speed Downlink Packet Access) communication standard, and the like can be used for example.

And, the prescribed server can include a server managed by a service provider (SP) and a content provider (CP).

And, the application list can include an application execution menu item of the searched application. The application execution menu item can include a name of an application as a text data or include an icon corresponding to each application as an image data.

It is able to display an application key screen of a random application among the applications included in the application list [S102].

The key screen of an application corresponds to one of information windows displayed in a prescribed area of the display unit in a manner of including image information on the application.

In particular, the key screen can include a screen shot of an execution screen of the application as image information and can be displayed in the display unit of the image display device in a form of a card. Regarding a display form of the key screen shall be described in detail with reference to FIG. 20.

If the application list of the previous step ([S101]) is displayed, the image display device can display an application key screen of the application where an application execution menu item is situated at the very first among the applications included in the application list according to embodiment. And, the image display device can further display the application key screen of the application menu items adjacent to the application execution menu item of which the key screen of the application is displayed.

And, according to a different embodiment, the image display device can display a selection block configured to select an application execution menu item or an application key screen of the application corresponding to a position of a pointer. In particular, for instance, if the pointer is positioned at the above of a random application execution menu item, the application key screen of the application at which the pointer is situated can be displayed and the image display device can further display the application key screen of the application menu items adjacent to the application execution menu item of which the key screen of the application is displayed.

Hence, in case that the selection block or the pointer moves according to a user input, the image display device can modify the displayed key screen in response to the movement.

The image display device can display at least one key screen. The number of the displayed key screen can be modified according to a user configuration. In case that a plurality of key screens are displayed in one screen, the image display device can display the key screens in a manner of overlapping a part of the key screens.

In the following FIG. 20 to FIG. 23, a case that 3 application key screens are displayed is depicted with an example.

In particular, a user can obtain the information on what function is performed by an application and what is the operations of the application via the key screen even prior to directly executing the application.

The image display device can display an advertisement key screen [S103].

According to embodiment, the image display device can display an advertisement key screen equipped with an advertising area as well as the key screen of an application.

The advertisement key screen corresponds to an information window capable of being displayed in a prescribed area of the display unit in a manner of including an image data for a random advertising and the advertisement key screen can be displayed in a form of a card. And, the advertisement key screen can be displayed in a manner that a certain part of the advertisement key screen is overlapped with the key screen of the application.

And, according to embodiment, the image display device transmit a user information to a server via a network and can display the advertisement key screen in a manner of receiving an image information of the advertisement key screen from the server.

The user information can include information on the application installed in the image display device by a user, information on the content use used by the user via the image display device, and broadcasting watching information of the user. And, in order to protect personal information of the user, the user information can be transmitted to the server only if there exists information on information utilization agreement preconfigured to the user.

In particular, the image display device can simultaneously display the key screen of the application and the advertisement key screen in a manner of overlapping the key screen of the application and the advertisement key screen. Since a part of the advertisement key screen can be displayed in a manner of being overlapped, aversion of a user can be reduced in displaying an advertising area and interest of the user can be induced by blocking a certain part of the adverting area.

The image display device can receive an application selection signal [S104].

According to embodiment, a user determines an application necessary for performing a preferred operation via the application list or the key screen and can input the application selection signal in a manner of selecting an application selection menu item corresponding to the determined application.

As a means for inputting the signal, such various input means as a remote controller, a local key of the image display device, a touch screen, and the like can be used.

The image display device can display a key screen corresponding to the selected application in a manner of expanding the key screen [S105].

Figure 24:
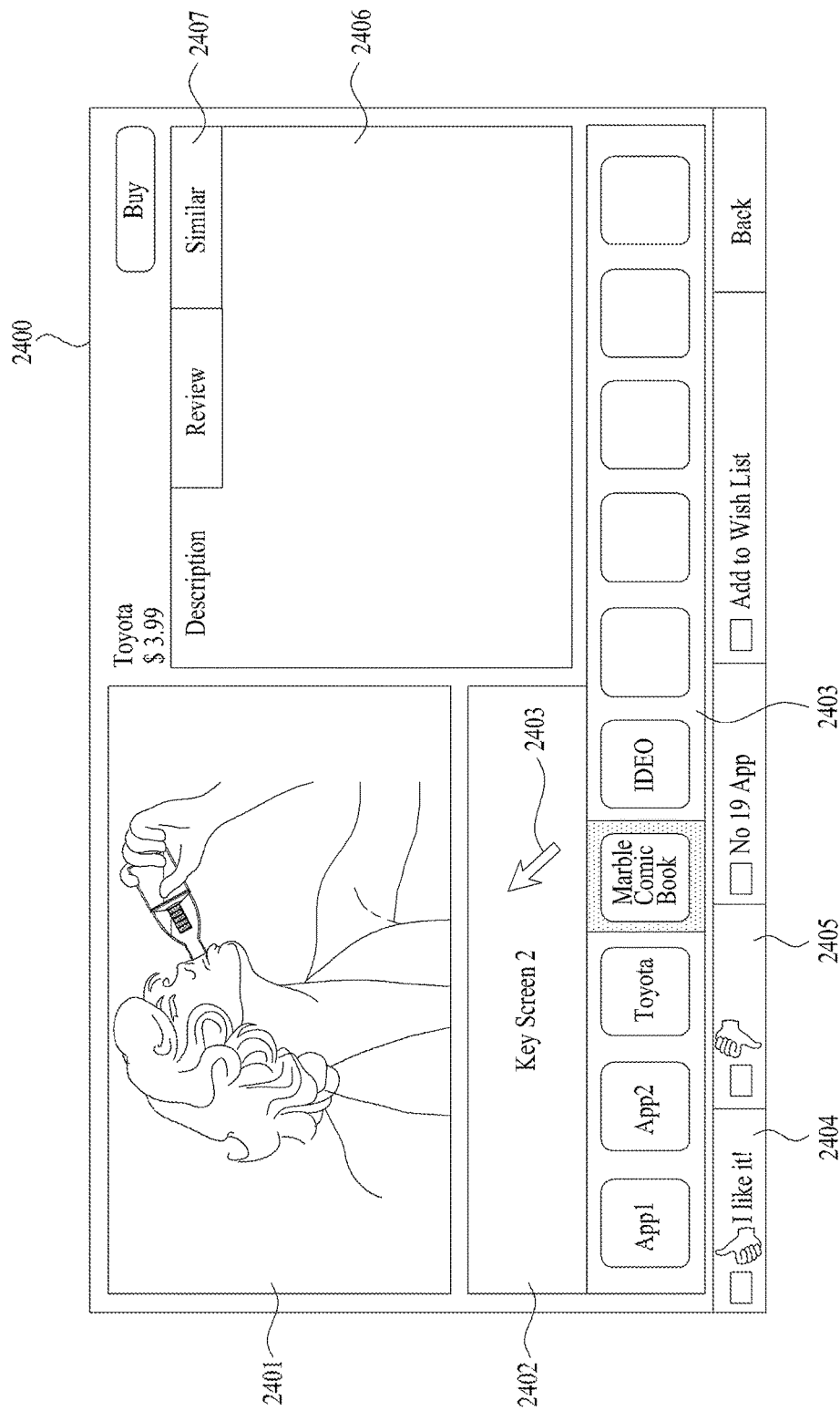
FIG. 24 to FIG. 25 are diagrams of display screen including an expanded key screen according to embodiment of the present invention.
Figure 25:
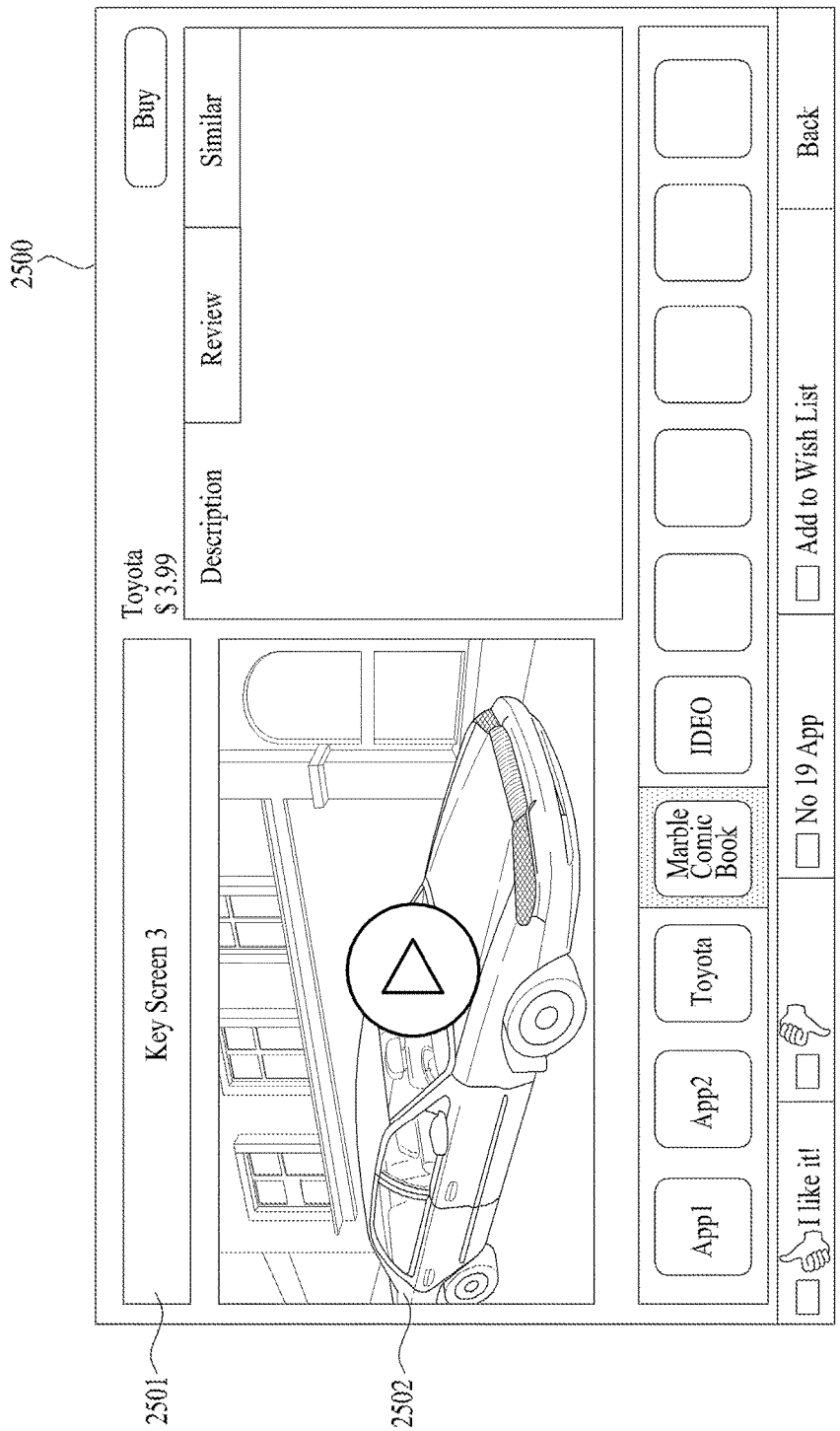

According to embodiment, if a selection signal of an application is received, the image display device can display the key screen corresponding to the selected application in a manner of expanding the key screen. Regarding a display screen including the expanded key screen is depicted in FIG. 24 to FIG. 25.

And, the image display device can display detail information on the selected application together. The detail information can include text information on the selected application, evaluation information, and the like.

In particular, if a selection signal of a random application is inputted by a user, the image display device provides the user with an expanded key screen of the selected application and the detail information. Thus, the user can easily determine whether the selected application corresponds to the application capable of performing a preferred operation.

And, a method of providing an application menu according to one embodiment of the present invention can further include the steps of obtaining the information included in a key screen in more detail in a manner of displaying the key screen of the application by inputting an application confirmation signal and a step of driving the application in a manner of inputting an application execution signal.

In particular, by using the application menu displayed via the aforementioned process, a user can more easily identify the information on the application and a service provider can efficiently deliver an advertisement to the user using the image display device.

Figure 20:
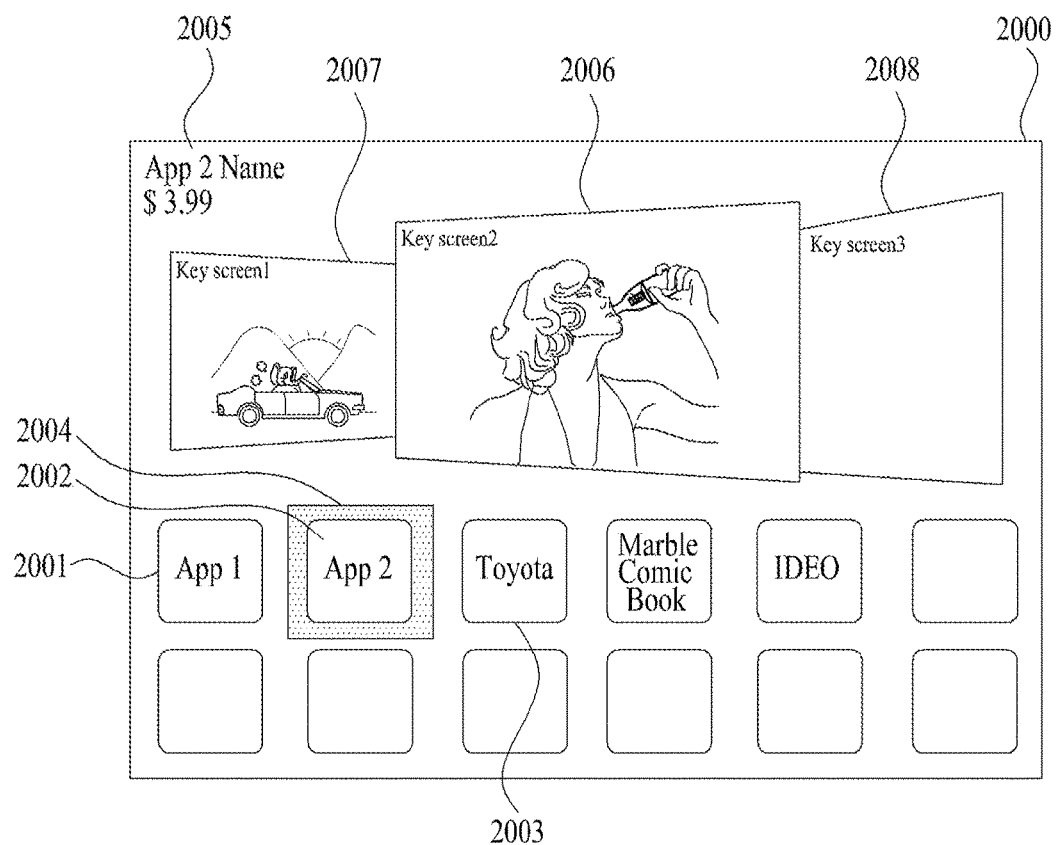
FIG. 20 is a diagram of a display screen including an application menu according to embodiment of the present invention.

FIG. 20 is a diagram of a display screen 2000 including an application selection menu according to embodiment of the present invention.

According to embodiment, the image display device searches for an application available in the image display device and can display a $1^{st}$ application list including application execution menu items (2001, 2002, and 2003) of the searched application.

The $1^{st}$ application list includes a name of each application in a form of a text data or can include an icon of each application in a form of an image data.

As described in FIG. 19, the application available in the image display device can include the application installed in the image display device and an application capable of being installed in the image display device via a network.

And, the image display device can include a key screen of the application. The key screen can include an image data for a major execution screen of the application. According to embodiment, the key screen can be adjusted to a random number according to a display screen of the image display device. In particular, the number of key screens outputted in one screen can be modified according to a user configuration.

For instance, as depicted in FIG. 20, the image display device can display 3 key screens. In particular, in case that an application selection block 2004 is positioned at 'App 2' application execution menu item in the $1^{st}$ application list, a $2^{nd}$ key screen 2006 corresponding to the 'App 2' application is displayed in the middle of a screen and a $1^{st}$ key screen 2207 and a $3^{rd}$ key screen 2008 corresponding to the applications 2001, 2003 positioned at the left and right side of the 'App 2' application in the $1^{st}$ application list can be displayed in the left and right of the key screen 2006 of the 'App 2'.

And, if the selection block 2004 is moved, the key screens (2006, 2007, and 2008) can be converted into a key screen of an application at which the selection block is situated and key screens of applications positioned at the left and right of the application.

And, an application name of the application at which the selection block 2004 is positioned and information 2005 on a price and the like can be displayed as well.

Figure 21:
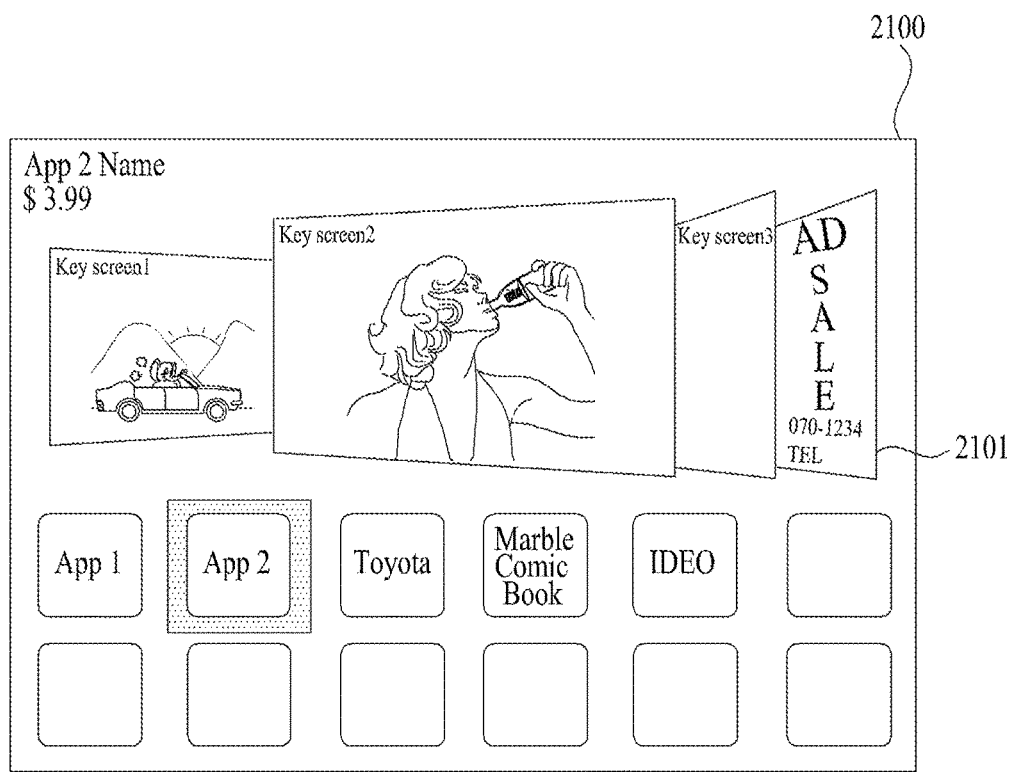
FIG. 21 is a diagram of a display screen including an application menu containing an advertising area according to embodiment of the present invention.

FIG. 21 is a diagram of a display screen 2100 including an application menu containing an advertising area according to embodiment of the present invention.

According to embodiment, the image display device can display the advertising area together in the application menu configured to select and execute an application.

In particular, referring to FIG. 21, an advertisement key screen (AD key screen) 2101 can be further displayed in the application menu like as described in FIG. 20.

According to embodiment, the advertisement key screen may correspond to an image stored in the image display device in manufacture. And, if the image display device is connected to a network, the stored image can be periodically updated via the network.

And, according to embodiment, the advertisement key screen can be displayed in a manner of being customized to a user. In particular, the image display device transmits information on the application installed in the image display device and the information on such a watching behavior as a preferred channel of the image display device of the user, a preferring time, and the like to a server of a service provider (SP) via the network, the server transmits an advertisement image corresponding to the received informations to the image display device. By doing so, the advertisement key screen appropriate for the user of the image display device can be displayed.

And, in case of receiving the advertisement key screen via the network, the image display device searches for agreement information on the application installation information and utilization of watching behavior information. The image display device can be configured to transmit the information only when the agreement information is pre-stored. And, if the agreement information does not exist, the image display device can make a request for an input of the agreement information on utilization of the information.

In particular, via the display screen shown in FIG. 21, the image display device provides an application list capable of being efficiently used in the image display device. Moreover, the image display device can display an advertising screen without disturbing the display screen of the application list. Hence, the image display device can conveniently provide the advertising screen to a user without any aversion.

Figure 22:
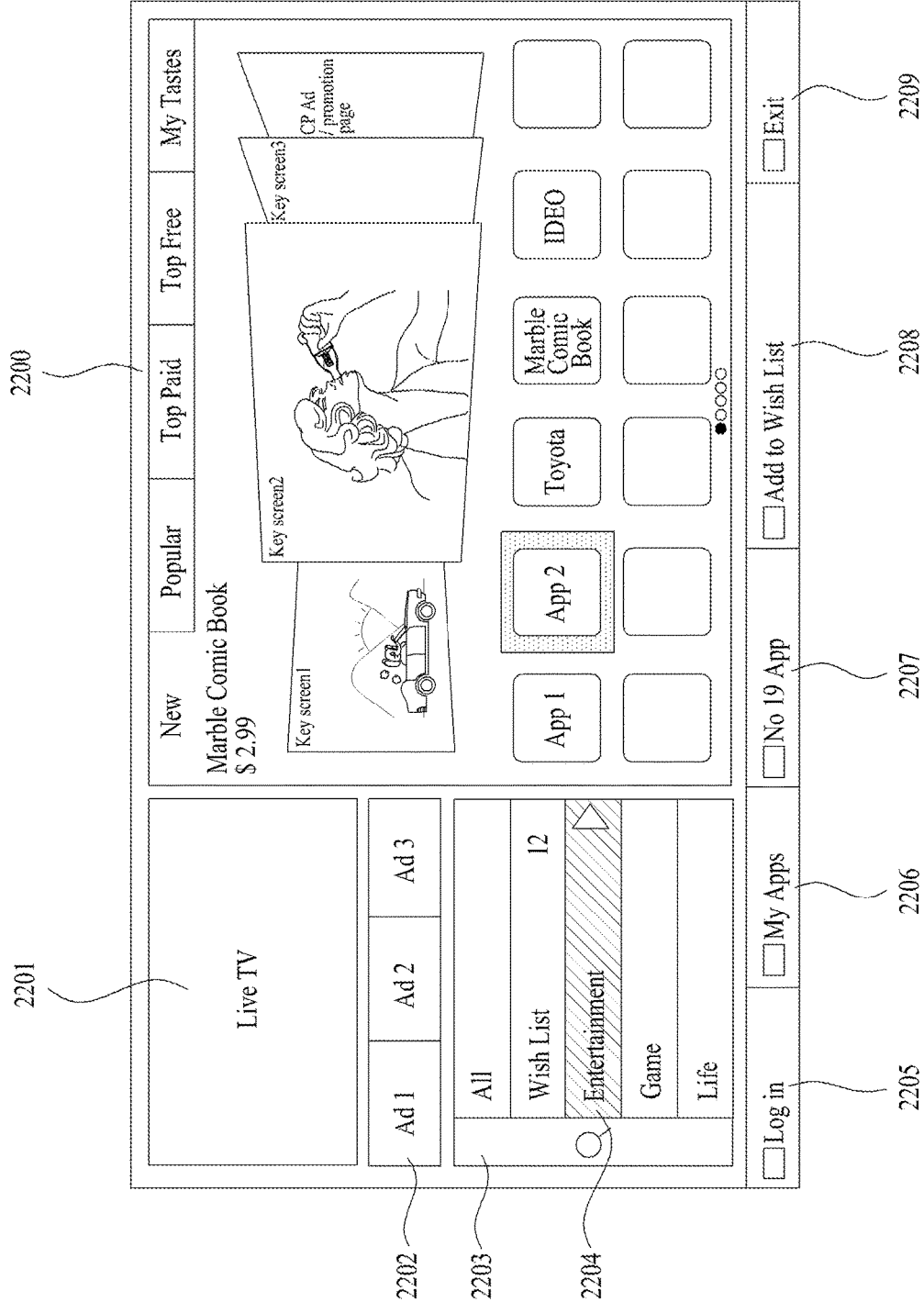
FIG. 22 is a diagram of a display screen including an application list control menu according to embodiment of the present invention.

FIG. 22 is a diagram of a display screen 2200 including an application list control menu according to embodiment of the present invention.

According to embodiment, the image display device can display a prescribed menu and menu items capable of providing easy of use to a user together with the application menu screen depicted in FIG. 20 to FIG. 21.

Referring to FIG. 22, the image display device can display a broadcasting content playing screen 2201, an advertisement banner 2202, an application search menu 2203, a search item selection block 2204, a log in menu item 2205, a personal application list calling menu item 2206, an application filtering menu item 2207, a bookmark registration menu item 2208, and an exit menu item 2209.

The broadcasting content playing screen 2201 is configured to play a broadcasting content in a prescribed area of a display screen in a state that the image display device displays an application menu. The image display device can display the broadcasting content in a manner of receiving a broadcasting signal of a channel of which a user watched the very last.

Besides the broadcasting content, the image display device can display a moving image content stored in the image display device in advance or picture content in the playing screen 2201 according to embodiment.

In particular, by doing so, a user can watch a broadcasting content in the state that an application menu is displayed in the image display device.

The application search menu 2203 is a menu configured to search for an execution menu item of an application capable of being used in the image display device. The application search menu can include a menu item capable of searching for an application.

In particular, in case that the search item selection block 2204 is positioned at 'All', an application list can include execution menu items for all applications available in the image display device. In case that the search item selection block 2204 is positioned at 'Wish list', the application list can include execution menu items for the applications of which a user stored bookmark information. And, in case that the search item selection block 2204 is positioned at 'Entertainment', 'game', 'life', respectively, the application list can include the execution menu items of the application corresponding to each category.

The log in menu item 2205 enables a user to log in.

In particular, according to embodiment, since there exist an application that an application execution menu item is activated only when a user log in is performed, if a user inputs a selection signal of the log in menu item 2205, the image display device displays a log in menu that the user is able to input a user ID or a password. In case that the user ID and the password are inputted by the user, the image display device checks the inputted information and may be then able to activate the application execution menu items requiring the user log in.

And, in case that the user log in is already performed, if the user selects the log in menu item 2205, the image display device cancels the previous user log in and enables the user to log in with a different ID.

In case that one image display device is used by a plurality of users, the personal application list calling menu item 2206 can make an application list corresponding to each user to be displayed.

In particular, if a selection signal of the personal application list calling menu item 2206 is received, the image display device displays a list of each user registered in the image display device. If one user is selected among the list of users, the image display device loads user information of the selected user and may be then able to display an application list corresponding to the selected user.

The application filtering menu item 2207 can make the application list to be displayed in a manner of being filtered.

In particular, if a user selects the application filtering menu item, the image display device searches the application list for an object of filtering according to preconfigured filtering information and can display the application list including the application execution menu item of which the searched application is excluded only.

For instance, in case that a filtering signal for an application for adult is inputted, the image display device can delete an execution menu item for the application for adult from the application list.

The bookmark registration menu item 2208 can make a random application to be added to a bookmark list of the image display device.

In particular, if a selection signal of the bookmark registration menu item is inputted and an application menu item to be added is selected, the image display device adds the selected application to the bookmark list and stores configuration information. Thereafter, if a user selects 'Wish List' search item of the application search menu 2203, the image display device can be configured to display an application list in a manner of including the execution menu item of the selected application.

The exit menu item 2209 erases the currently displayed application list and can return to the display screen before the application list is displayed.

Figure 23:
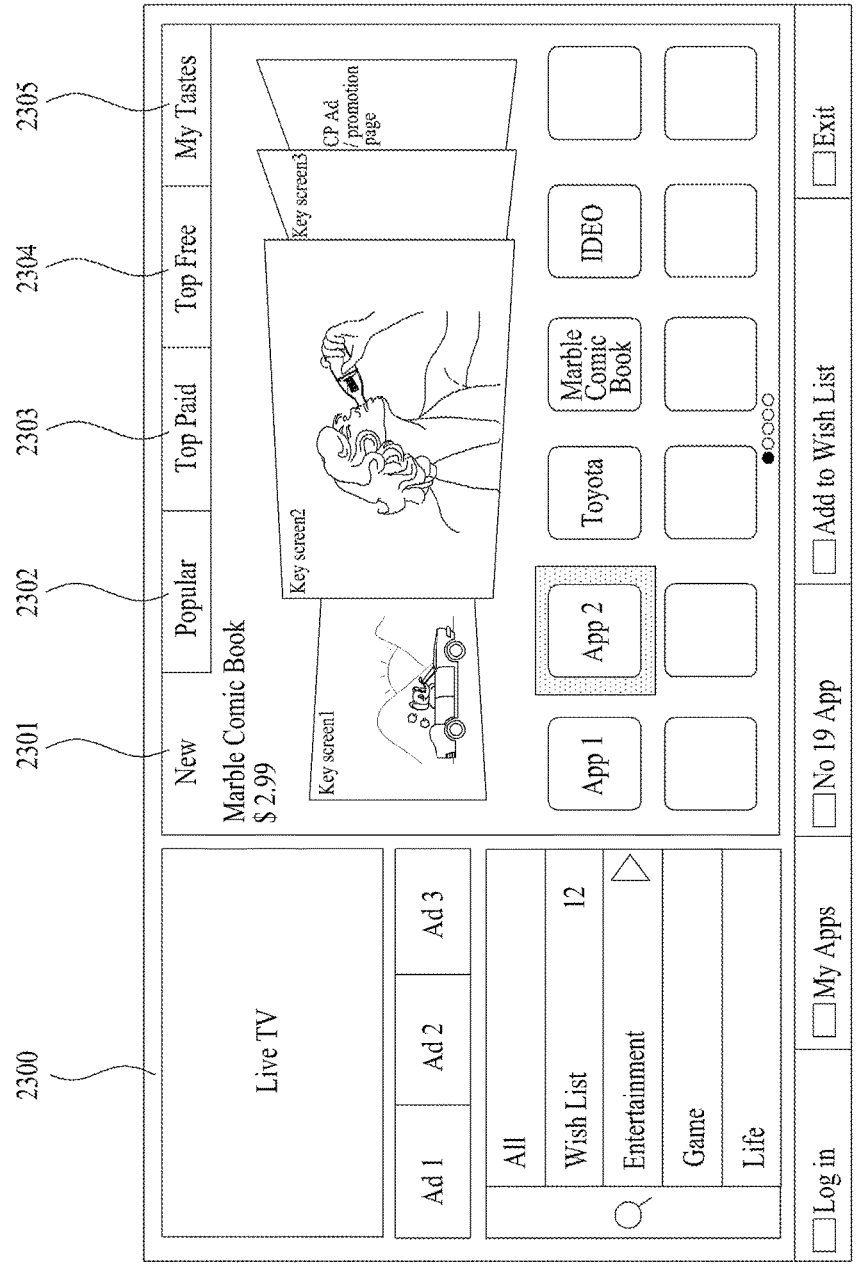
FIG. 23 is a diagram of a display screen including an application list selection menu according to embodiment of the present invention.

FIG. 23 is a diagram of a display screen 2300 including an application list selection menu according to embodiment of the present invention.

According to embodiment, the image display device can display an application list selection menu capable of selecting an application list.

The application list selection menu can include each menu item capable of selecting a new application list 2301, a popular application list 2302, a top paid application list 2303, a top free application list 2304, a preferring (my tastes) application list 2305.

Specifically, the new application list 2301 can include a list of an application recently installed in the image display device or an application list recently registered in a random server. A time range of the 'recently' can be modified to a day, a week, a month, and the like according to a user configuration.

The popular application list 2302 can include a list of an application having a highest evaluation score among the applications for which the image display device searched or an application list having the largest number of execution.

The top paid application list 2303 can include a list of an application having a greatest amount of sales among the applications for which the image display device searched.

The top free application list 2304 can include a list of a free application having a highest evaluation score or a free application recorded the largest number of download among the applications for which the image display device searched.

The preferring (my tastes) application list 2305 can include an application list corresponding to a preferring genre of a user, a preferring production company, and the like among the applications for which the image display device searched.

In particular, if a specific list is selected among the aforementioned lists (2301, 2302, 2303, 2304, and 2305), the image display device can be designed to display a list of the application belonging to a corresponding group only. Hence, a user can have a technical advantage capable of promptly checking a key screen of the application that the user wants without searching for all applications.

FIG. 24 to FIG. 25 are diagrams of display screens 2400/2500 including an expanded key screen according to embodiment of the present invention.

According to embodiment, if an application selection signal is received in a state that the application list of FIG. 20 to FIG. 23 and a key screen are displayed, the image display device can display the key screen of the selected application in a manner of expanding.

In particular, referring to FIG. 24 to FIG. 25, if an execution menu item of 'App 2' application is selected via an application selection block 2406, the image display device can display a $2^{nd}$ key screen 2401 corresponding to the 'App 2' application in a manner of expanding. Along with the $2^{nd}$ key screen 2401, the image display device can display a key screen list including at least one different key screen.

The key screen list can display a part of a $3^{rd}$ key screen 2402 while displaying the $2^{nd}$ key screen 2401 in a manner of expanding. And, the key screen list can scroll the key screen included in the key screen list. Hence, if a user inputs a scroll signal or a direction key in a manner of dragging the key screen to the top or bottom using a pointer 2403, the image display device can scroll the key screen included in the key screen list.

In particular, if a scroll signal is inputted in the key screen list in FIG. 24, the image display device can display the $3^{rd}$ key screen 2402 or a different key screen by scrolling the key screen list.

According to embodiment, the $2^{nd}$ key screen 2402 or the different key screen can include an advertisement key screen or a key screen of the application corresponding to the application selection menu item adjacent to the selection menu item of the selected application among the applications included in the application list.

And, the image display device can display detail information 2406 corresponding to the selected application. The detail information can include summary information on the selected application, review information, and information on a similar application. The image display device can include a detail information selection tab 2407 to browse the informations.

And, the image display device can display a $2^{nd}$ application list 2403 including an application selection menu item. The $2^{nd}$ application list 2403 can include an application selection block 2406. In case that a position of the selection block 2406 changes, the image display device can convert the displayed key screens to correspond to the changed position of the selection block 2406.

In particular, as shown in FIG. 24, in case that the selection block 2406 is positioned at the above of the 'App 2' application selection menu item, the $2^{nd}$ key screen 2401 may correspond to a key screen including a screen shot of the 'App 2' application and the $3^{rd}$ key screen may correspond to a key screen including a screen shot of a 'Toyota' application. And, in case that the selection block 2406 is positioned at the above of the 'Toyota' application, the key screen list is scrolled. Hence, as shown in FIG. 25, the $2^{nd}$ key screen 2401 is scrolled up and a part of the $2^{nd}$ key screen is displayed only. And then, a full screen of the $3^{rd}$ key screen can be displayed.

And, if a selection signal of an application recommendation menu item 2404 is inputted, the image display device can receive a recommendation evaluation score for an application and a recommendation comment. If a selection signal of an application criticism menu item 2405 is inputted, the image display device can receive a criticism evaluation score for an application and a criticism comment.

Figure 26:
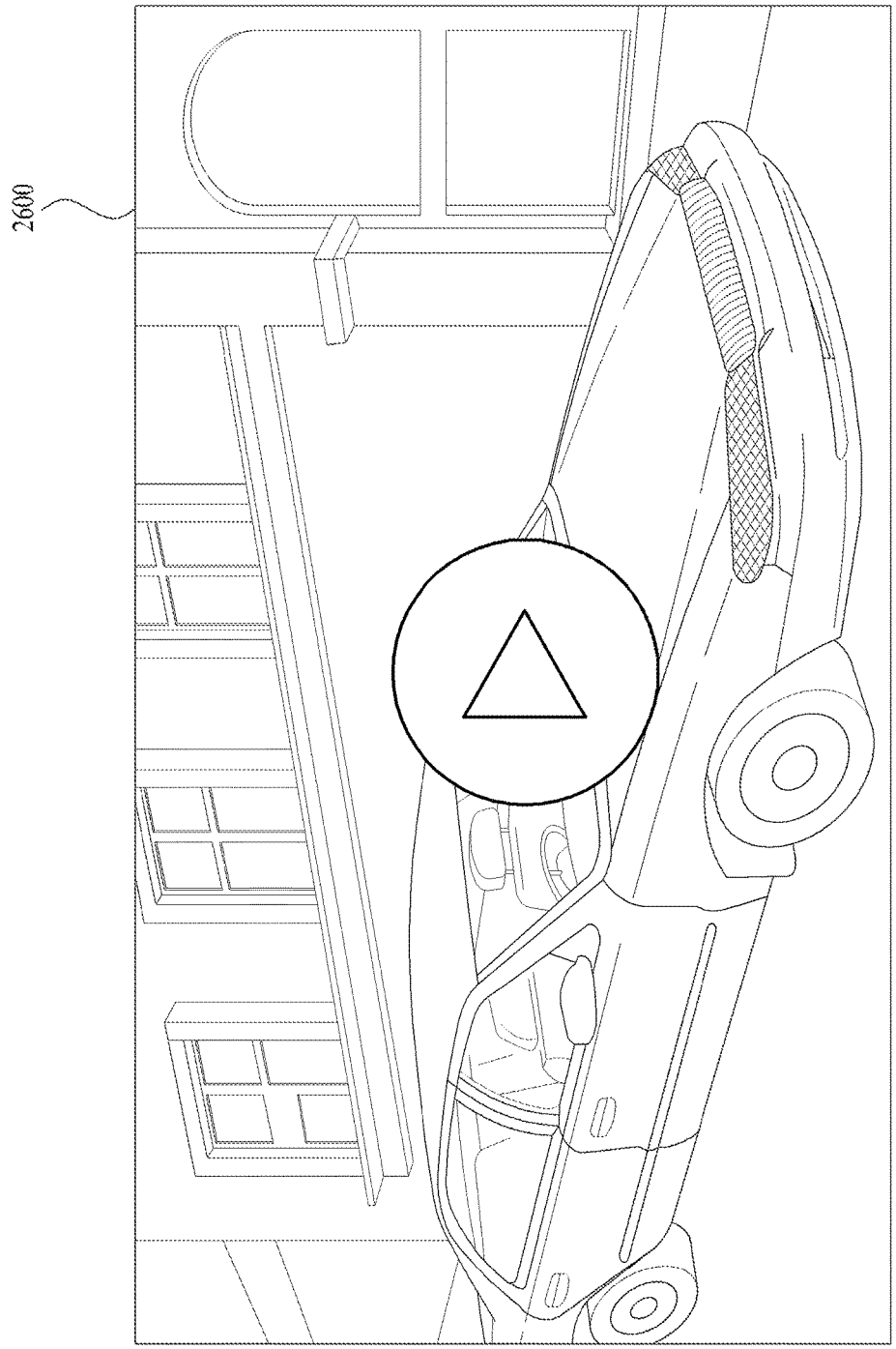
FIG. 26 is a diagram of a display screen that a key screen of FIG. 24 to FIG. 25 is expanded to a full screen.

FIG. 26 is a diagram of a display screen 2600 that a key screen of FIG. 24 to FIG. 25 is expanded to a full screen.

According to embodiment, if an application confirmation signal is inputted from a user in a state that the key screen in FIG. 24 to FIG. 25 and the $2^{nd}$ application list are displayed, the image display device can display a key screen of an application corresponding to the confirmation signal in a manner of expanding to a full screen.

And, if an application execution signal is inputted from a user in a state that the display screen depicted in FIG. 26 is displayed, the image display device can execute an application corresponding to the execution signal.

In particular, by doing so, since the user can determine whether to execute an application in a manner of clearly checking a screenshot of the application, thereby reducing malfunction of the image display device.

Figure 27:
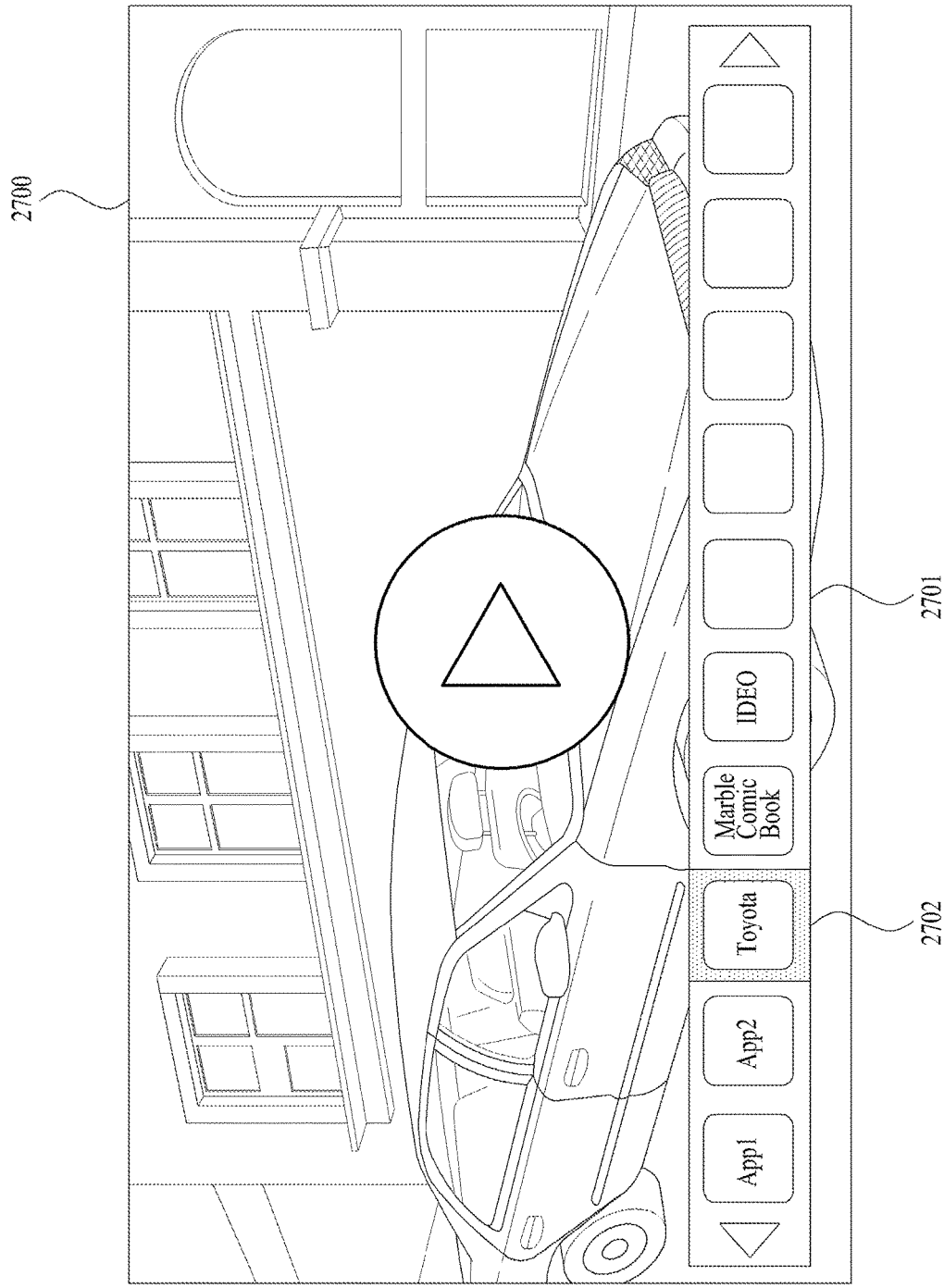
FIG. 27 to FIG. 28 are diagrams of a display screen for a key screen including an application list according to embodiment of the present invention.
Figure 28:
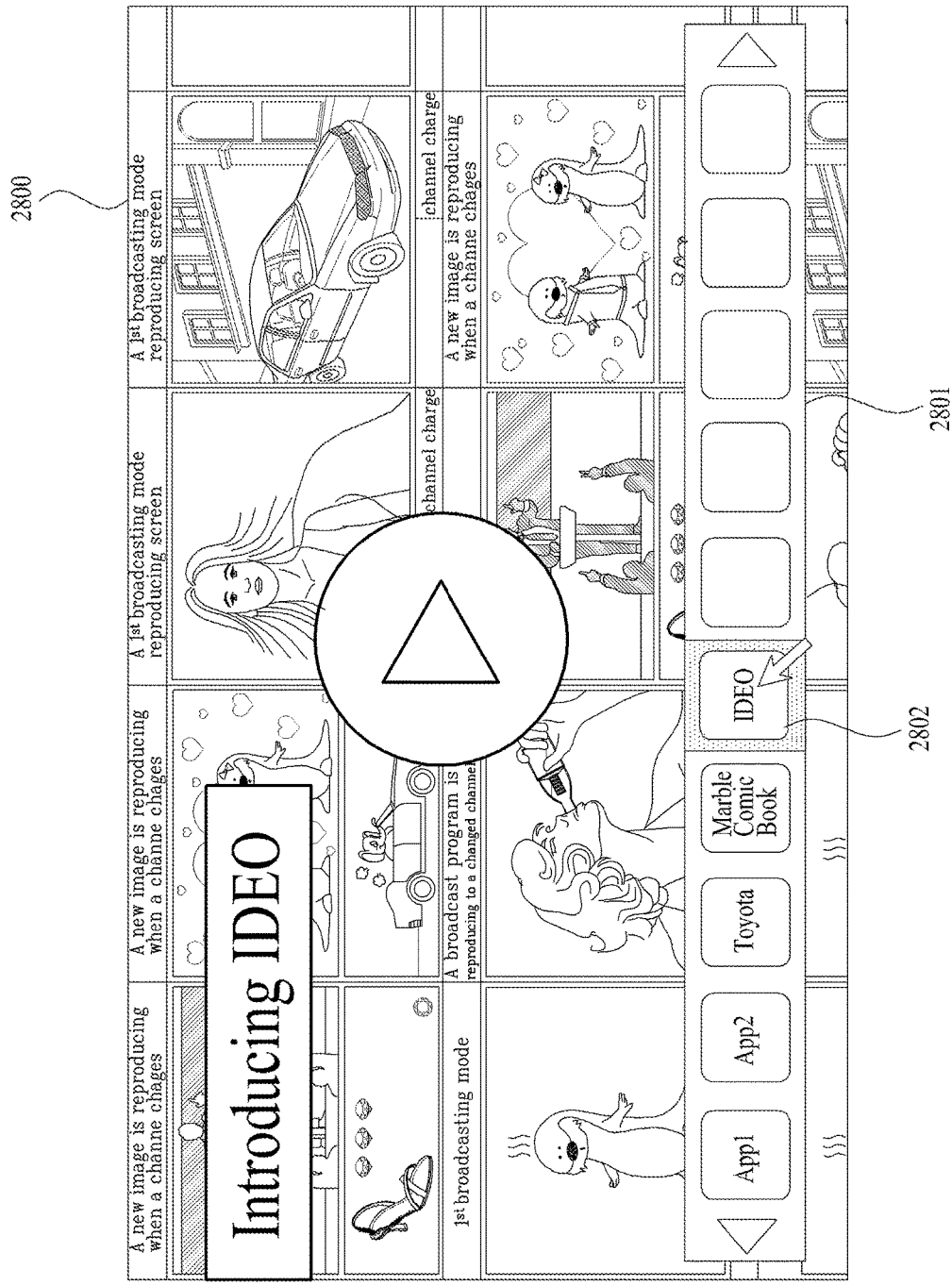

FIG. 27 to FIG. 28 are diagrams of display screens 2700/2800 of a key screen including an application selection menu according to embodiment of the present invention.

According to embodiment, the image display device can display a $2^{nd}$ application list 2701 in a state that the display screen in FIG. 26 is displayed.

The $2^{nd}$ application list 2701 can include selection menu items of an application available in the image display device and can include a selection block 2702 to select a prescribed application.

And, the image display device can convert a key screen, which is displayed as a full screen according to a movement of the selection block 2702. In particular, in case that the selection block 2702 is positioned at the above of a 'Toyota' application in a $3^{rd}$ application list 2701, the image display device can display a key screen corresponding to the 'Toyota' application in the display screen 2700. In case that the selection block 2702 moves to the above of an 'IDEO' application, the image display device can convert to display a key screen corresponding to the 'IDEO' application in the display screen 2800.

FIG. 29 is a diagram of a display screen 2900 including a key screen conversion menu according to embodiment of the present invention.

According to embodiment, the image display device can display key screen conversion menu items 2901/2902 in a state that a key screen of a selected application is displayed in a full screen 2904 of a display screen of the image display device.

Referring to FIG. 29, for instance, in case that a $3^{rd}$ application list 2903 is displayed to select an application and an application selection block 2905 is currently situated at the above of a 'Marble Comic Book' application, the image display device can display a key screen of the 'Marble Comic Book' application in the full screen 2904 of the display screen of the image display device.

And, the image display device can display a left side key screen conversion menu item 2901 and a right side key screen conversion menu item 2902. If the left side key screen conversion menu item 2901 is selected by a user, the image display device can convert into a key screen of a 'Toyota' application, which is positioned at the left side of the current application selection block 2905 in the $3^{rd}$ application list 2903, as a full screen of the display screen of the image display device. On the contrary, if the right side key screen conversion menu item 2902 is selected by the user, the image display device can convert into a key screen of an 'IDEO' application, which is positioned at the right side of the current application selection block 2905 in the $3^{rd}$ application list 2903, as a full screen of the display screen of the image display device.

And, a selection signal of the key screen conversion menu item can be inputted in a manner that the user selects the key screen conversion menu item by moving a pointer. Or, according to embodiment, the selection signal of the key screen conversion menu item can be inputted by simply inputting a left/right direction key of a remote controller or a local key.

And, the key screen conversion menu item 2901/2902 can include the key screens of the left/right side as a reduced image in size. In particular, the left side key screen conversion menu item 2901 can be displayed as the reduced image of the key screen of the 'Toyota' and the right left side key screen conversion menu item 2902 can be displayed as the reduced image of the key screen of the 'IDEO'.

Unlike the diagram depicted in FIG. 29, if the $2^{nd}$ application list 2903 is displayed with a plurality of lines including application selection items, a top and bottom key screen conversion menu item as well as the left/right key screen conversion menu items can be displayed in a top side and the bottom side of the display unit, respectively.

In particular, via the aforementioned key screen conversion menu item, a user can simply convert a display screen into a preferring key screen without returning to an application selection menu again.

If it is explained again in summary, the image display device (e.g., a multimedia device and the like) according to one embodiment of the present invention includes a broadcasting network interface receiving a broadcasting program and an internet network interface receiving a data, which identifies at least one application. And, the multimedia device includes a display module configured to display the received broadcasting program in a $1^{st}$ area of a screen and configured to display an application list including an icon, which corresponds to the at least one application, in a $2^{nd}$ area of the screen and a user interface configured to receive a signal for selecting a specific icon among the icons displayed in the $2^{nd}$ area. And, the multimedia device includes a controller configured to control a key screen corresponding to the selected specific icon to be displayed in a $3^{rd}$ area of the screen.

For instance, the $3^{rd}$ area includes a full image of the key screen corresponding to the selected specific icon and a part of image of a key screen corresponding to a $2^{nd}$ icon adjacent to the selected specific icon.

And, the controller is configured to control the display module to display a moving image from a $1^{st}$ timing point to a $2^{nd}$ timing point, which corresponds to timing points that the selected specific icon is executed, in the $3^{rd}$ area of the screen.

Moreover, the controller is configured to modify a key screen, which is displayed in the $3^{rd}$ area according to a change of the icon selected in the $2^{nd}$ area. In particular, it may be complementally interpreted with reference to FIG. 2, FIG. 22 to FIG. 26, and the like.

The image display device according to the present invention and a method of operating therefor may be non-limited to the aforementioned configurations and method of embodiments. The embodiments may be composed in a manner that a whole or a part of the each of the embodiments is selectively combined to achieve various modifications.

Meanwhile, a method of operating an image display device according to the present invention can be implemented with a code readable by a processor in a recording media readable by the processor, which is equipped in an image display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

Various embodiments of the present invention are described in the 'best mode' part.

INDUSTRIAL APPLICABILITY

Since the embodiments of the present invention are applicable to a broadcasting system or an image display device (e.g., a smart TV, 3DTV, and the like), industrial applicability of the present invention is admitted.

What is claimed is:

1. A method of providing an application in a digital television, the method comprising:
receiving a broadcast signal carrying a broadcast program, the broadcast signal being received via a tuner;

displaying the broadcast program on a first window and a first application image on a second window in a display screen;

receiving a first control signal requesting to display a first application list including a plurality of application items;

displaying the first application list with the broadcast program and first application image in the display screen in response to the received first control signal;

receiving a second control signal selecting an application item from the displayed first application list; and displaying a second application image corresponding to the selected application item on the second window in the display screen to replace the displayed first application image in response to the received second control signal;

receiving a third control signal requesting to display a second application list including a plurality of application items;

switching the first application list into the second application list in the display screen in response to the received third control signal;

receiving a fourth control signal selecting an application item from the displayed second application list; and displaying a third application image corresponding to the selected application item on the second window in the display screen to replace the displayed second application image in response to the received fourth control signal, wherein the first through third application images are an image, including a screenshot image and video, obtained from execution of the first through third applications and are received via a network interface which is different from the tuner, and wherein the broadcast program is continuously displayed on the first window regardless of changing any application images on the second window.

2. The method of claim 1, wherein the application item is selected based on a location of a pointer of the remote controller or a key signal of the remote controller.

3. The method of claim 1, wherein the displayed first and second application images include a key screen, the key screen being a screen shot image of executing a corresponding application or downloaded from an external server.

4. The method of claim 1, wherein the selected application item displays a name of the corresponding application.

5. The method of claim 1, wherein the first application list includes personalized application items based on log-in data.

6. The method of claim 1 further comprising:
receiving a fifth control signal filtering one or more application items among the plurality of application items; and
displaying one or more application items except the filtered one or more application items on the display screen.

7. The method of claim 1 further comprises displaying detailed information with respect to the selected application item, wherein the detailed information includes abstract data, review data and related application data for an application of the selected application item.

8. The method of claim 1, wherein both the broadcast program displayed in the first window and at least one of the first through third application images are not related to each other.

9. A digital television comprising:
a tuner configured to receive a broadcast signal carrying a broadcast program;
a decoder configured to decode the received broadcast signal into a broadcast program;
a user interface configured to receive a first control signal requesting to display a first application list including a plurality of application items;
a controller configured to
display the decoded broadcast program on a first window and first application image on a second window in a display screen,
display the first application list with the broadcast program and the first application image in the display screen in response to the received first control signal,
display a second application image corresponding to a selected application item on the second window in the display screen to replace the displayed first application image in response to a second control signal selecting the application item from the displayed first application list via the user interface; and
a display,
wherein the user interface further receives a third control signal requesting to display a second application list including a plurality of application items and receiving a fourth control signal selecting an application item from the second application list,
wherein the controller is further configured to switch the first application list into the second application list in the display screen in response to the received third control signal and display a third application image corresponding to the selected application item on the second window in the display screen to replace the displayed second application image in response to the received fourth control signal,
wherein the first through third application images are an image, including a screenshot image and video, obtained from execution of the first through third applications and are received via a network interface which is different from the tuner, and
wherein the controller is further configured to continuously display the broadcast program on the first window regardless of changing any application images on the second window.

10. The digital television of claim 9, wherein the controller recognizes the application item being selected based on a location of a pointer of the remote controller or a key signal of the remote controller.

11. The digital television of claim 9, wherein the first and second application images include a key screen, the key screen being a screen shot image of executing a corresponding application or being downloaded from an external server.

12. The digital television of claim 9, wherein the controller further controls the selected application item to display a name of the corresponding application.

13. The digital television of claim 9, wherein the controller controls the display to display personalized application items based on log-in data.

14. The digital television of claim 9, wherein the second receiver further receives a fifth control signal filtering one or more application items among the plurality of application items, and wherein the controller further controls one or more application items except the filtered one or more application items to be displayed on the display screen.

15. The digital television of claim 9, wherein the controller further controls detailed information with respect to the selected application item to be displayed on the display screen, the detailed information including abstract data, review data and related application data for an application of the selected application item.

16. The digital television of claim 9, wherein both the broadcast program displayed in the first window and at least one of the first through third application images are not related to each other.

\* \* \* \* \*